United States Patent [19]

Notagashira

[11] Patent Number: 5,115,348
[45] Date of Patent: May 19, 1992

[54] LENS BARREL

[75] Inventor: Hidefumi Notagashira, Kanagawa, Japan

[73] Assignee: Canon Kabushiki Kaisha, Tokyo, Japan

[21] Appl. No.: 557,417

[22] Filed: Jul. 23, 1990

[30] Foreign Application Priority Data

| Jul. 26, 1989 [JP] | Japan | 1-192879 |
| Jul. 26, 1989 [JP] | Japan | 1-192880 |
| Jul. 26, 1989 [JP] | Japan | 1-192882 |

[51] Int. Cl.⁵ .................................. G02B 15/00
[52] U.S. Cl. ............................... 359/697; 359/694; 354/400
[58] Field of Search ............... 350/429, 430; 354/400, 354/402, 195.12

[56] References Cited

U.S. PATENT DOCUMENTS 4,806,000  2/1989  Shiokama et al. ............ 359/693
5,016,993  5/1991  Akitake ......................... 359/697

Primary Examiner—Loha Ben
Attorney, Agent, or Firm—Robin, Blecker, Daley & Driscoll

[57] ABSTRACT

A magnifying power varying device comprises an operation member which is arranged to permit selection between a power varying operation in a telephoto direction and a power varying operation in a wide-angle direction, a transmission mechanism for driving the power varying mechanism, a driving mechanism which generates a driving force, and a change-over mechanism which is arranged to connect the driving mechanism to the transmission mechanism when the power varying operation is performed in the telephoto direction or in the wide-angle direction by means of the operation member and to forcibly disconnect the driving mechanism from the transmission mechanism when the operation of the operation member is canceled.

38 Claims, 16 Drawing Sheets

LENS BARREL

BACKGROUND OF THE INVENTION

1. Field of the Invention

This invention relates to a lens barrel having a zooming function.

2. Description of the Related Art

The so-called motor-operated zoom lens barrel and the motor-operated zoom camera of the kind arranged to shift a focusing lens by a motor power and to shift a power varying lens (or a variator lens) also by a motor power have been commercialized. However, the use of the focusing lens and the variator lens not only has increased the sizes of the known motor-operated zoom lens barrel and that of the motor-operated zoom camera but also has increased their prices.

Meanwhile, a motor-operated zoom lens barrel and a motor-operated zoom camera which are arranged to have the focusing lens and the variator lens to be driven by a common motor have been proposed. Examples of such arrangement have been disclosed in U.S. Pat. No. 3,370,907 and Japanese Laid-Open Patent Application No. SHO 60-263911. The example disclosed in this U.S. Patent is arranged as described below:

There are provided a switching operation part which is arranged to make change-over between a focusing action and a zooming action and a switch which is arranged as follows: In the case of the focusing action, the switch causes the focusing lens to be driven and moved toward the nearest distance position thereof when the motor is rotated forward and toward an infinite distance position when the motor is rotated backward. In the case of the zooming action, the switch causes the variator lens to be driven and moved toward a telephoto end position when the motor is rotated forward and toward a wide-angle end position when the motor is rotated backward. The switching operation part and the switch are discretely arranged. Therefore, the proposed arrangement has necessitated a complicated operation. Further, in this case, nothing is disclosed in respect of automatically performing the focusing action. However, even if a focusing mechanism is arranged to automatically carry out the focusing action, the troublesome zooming operation would still remain unimproved because the switch which selects the telephoto direction or the wide-angle direction in zooming must be separately arranged from the focusing/zooming selecting operation part.

Meanwhile, the example disclosed in Japanese Laid-Open Patent Application No. SHO 60-263911 is arranged as follows: Switching between a focusing action and a zooming action is arranged to be effected through a control circuit in accordance with an instruction given from a selection switch which is provided for selection between the zooming toward a telephoto-end position and the zooming toward a wide-angle end position. That arrangement, however, necessitates the use of a solenoid, a clutch mechanism which acts in association with the solenoid and a solenoid control circuit besides the switch for selection of either the telephoto direction or the wide-angle direction. This results in an increase in cost. In addition to this, the solenoid must be energized every time the zoom switch is operated to select the telephoto direction or the wide-angle direction. Therefore, electric energy consumption increases. As a result, a battery must be replaced often.

Further, a lens barrel which has a lens holding frame arranged to be axially shiftable by rotating it is known. In the case of this known lens barrel, the lens holding frame is driven to rotate by a driving gear which is secured to a shaft disposed within the lens barrel. The lens holding frame is provided with a driven gear which is arranged in one body with the frame to engage the driving gear. The above-stated shaft is arranged within the lens barrel not to be movable in the axial direction. To ensure that the driving gear and the driven gear slidingly move relative to each other in the axial direction while they are retained in an engaged state in driving the lens holding frame, the axial length (or the tooth width) of the driven gear is arranged to be longer than the length of the stroke of the relative movement of these gears, i.e., the length of the stroke of the lens holding frame. However, the conventional lens barrel which is arranged in this manner has presented the following problems:

(i) As mentioned above, the axial length (or tooth width) of the driven gear must be arranged to be long, including at least the stroke length of the lens holding frame. This causes the lens holding frame to be longer than a length actually necessary and thus results in an increase in the inertial mass of the frame. In addition to that, the long frame causes an increase in the size of the whole lens barrel.

(ii) The necessity of arranging the driving and driven gears to make the relative axial sliding movement in an engaged state necessitates their teeth to be designed to have a large engaging clearance between them. This prevents these gears from being engaged with each other with a high degree of precision and prevents efficient power transmission. Further, the lens holding frame sometimes unevenly rotates. The lens, therefore, cannot be moved and positioned at a high degree of precision. This problem is serious, particularly in cases where the lens barrel has a telephoto lens system of a large rate of magnification.

SUMMARY OF THE INVENTION

It is one aspect of this invention to provide a lens barrel wherein a lens driving mechanism is arranged to be set in a state of permitting a focusing action without necessitating any switching operation, either when no (magnifying) power varying operation is performed or when a power varying operation is completed. The lens barrel according to this invention, therefore, can be simply operated and permits a photographing operation immediately after completion of a power varying action.

The above and further objects and features of this invention will become apparent from the following detailed description of embodiments thereof taken in connection with the accompanying drawings.

DETAILED DESCRIPTION OF THE PREFERRED EMBODIMENTS

Figure 1:
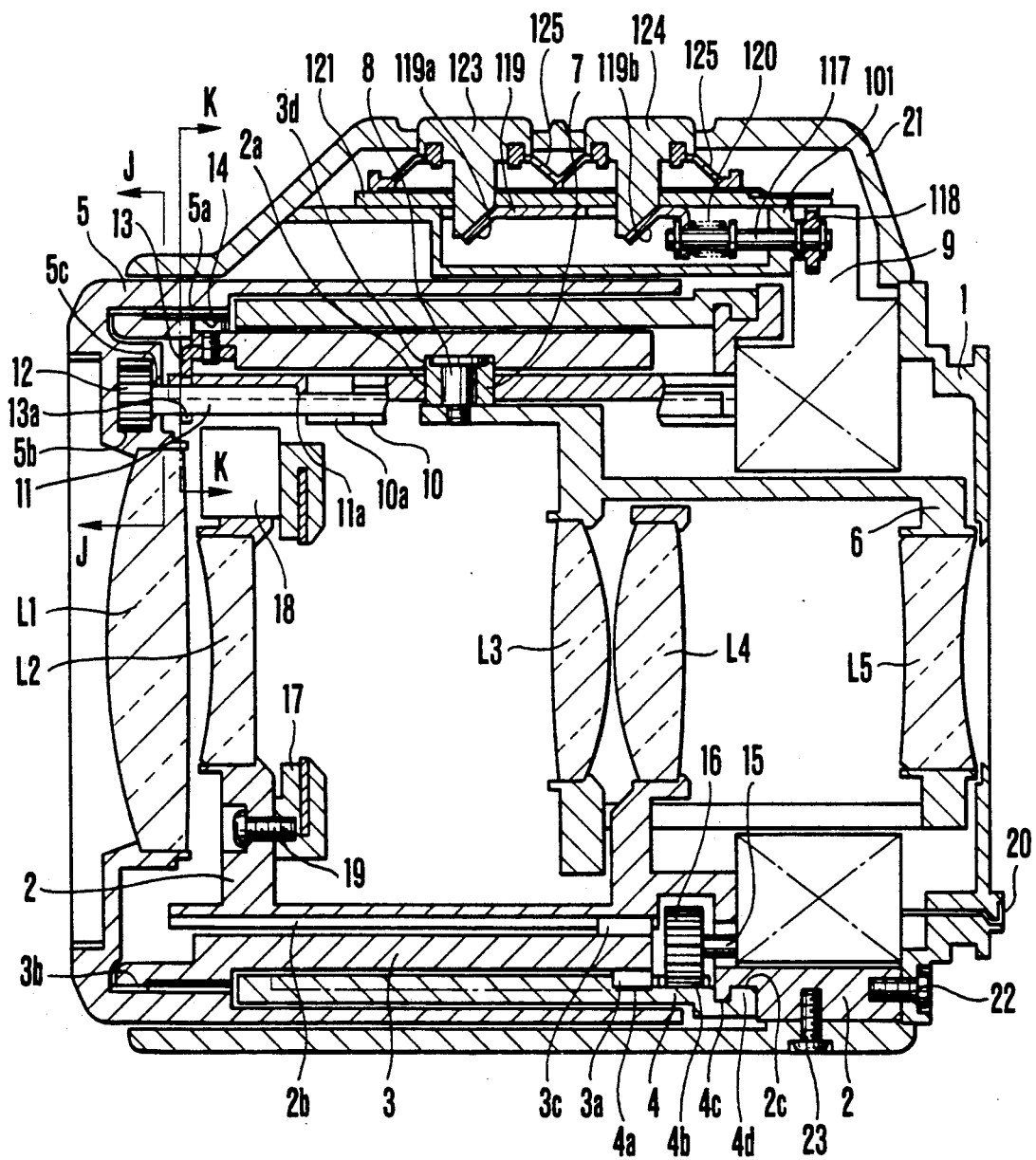
FIG. 1 is a vertical sectional view showing a zoom lens barrel which is arranged according to this invention as a first embodiment thereof.
Figure 2:
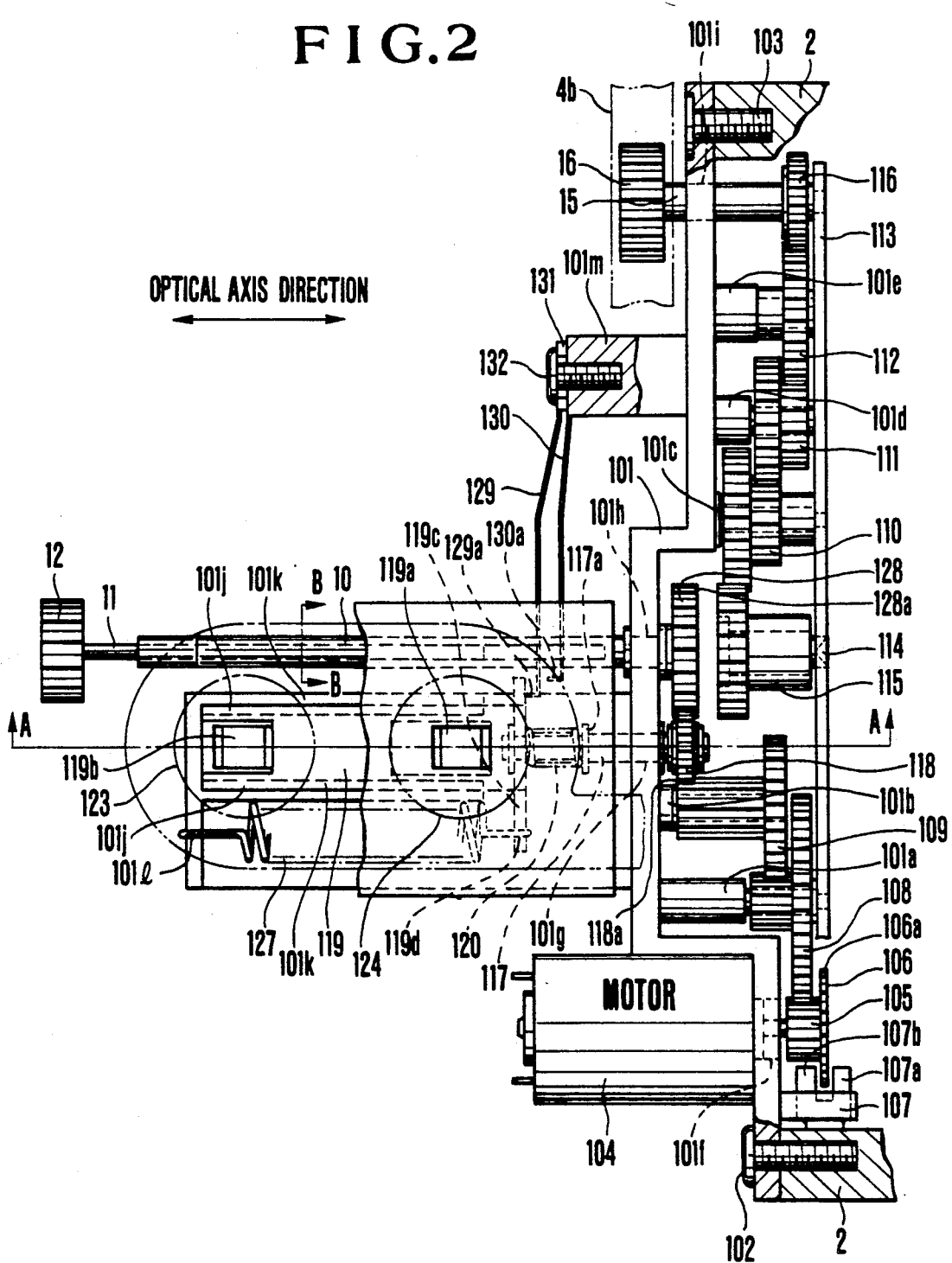
FIG. 2 is a developed plan view showing the lens driving mechanism of the lens barrel as in a state obtained immediately after completion of a power varying operation and also as in a state obtained when no power varying operation is performed.
Figure 3:
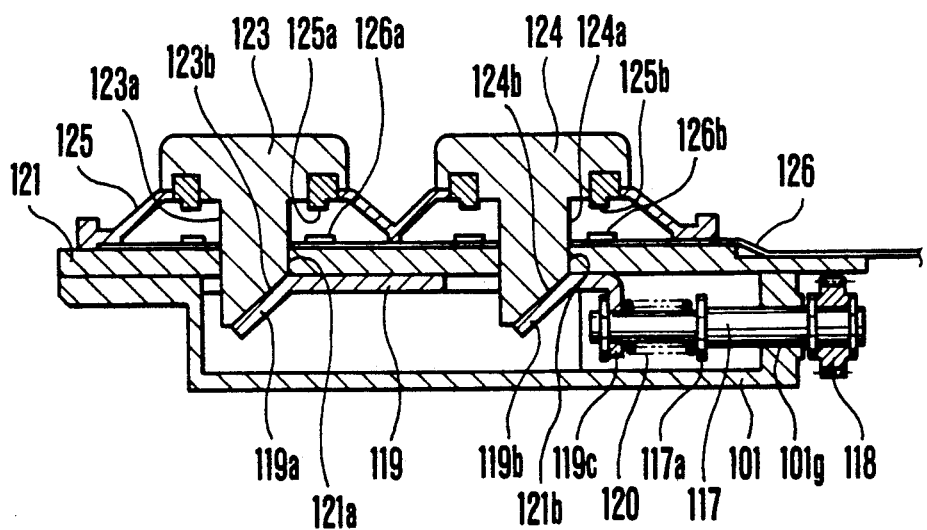
FIG. 3 is a sectional view which shows a part of the structural arrangement shown in FIG. 2 and is taken along a line A—A of FIG. 2.
Figure 5:
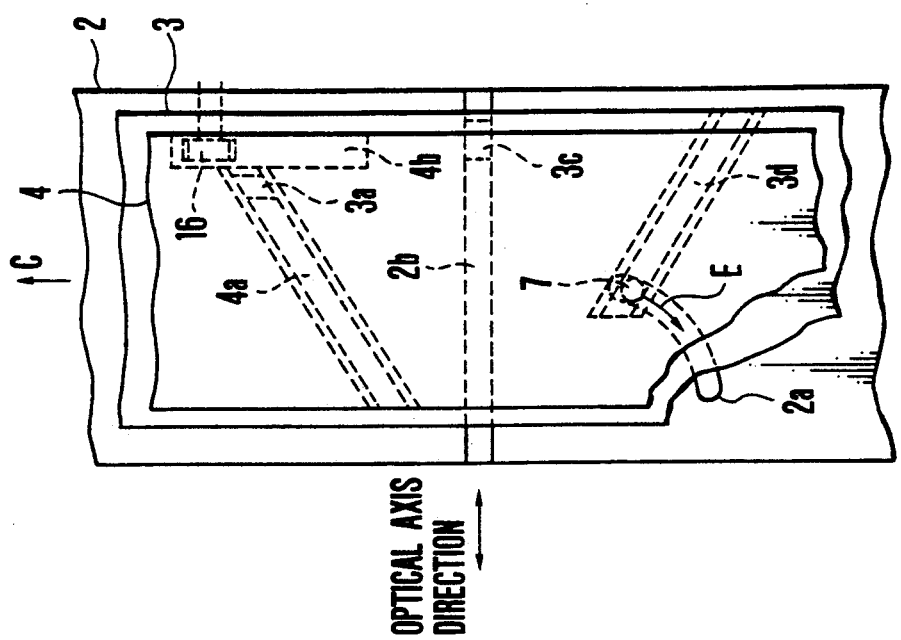
FIG. 5 is a developed plan view showing the same lens barrel part in a short focal length position.
Figure 4:
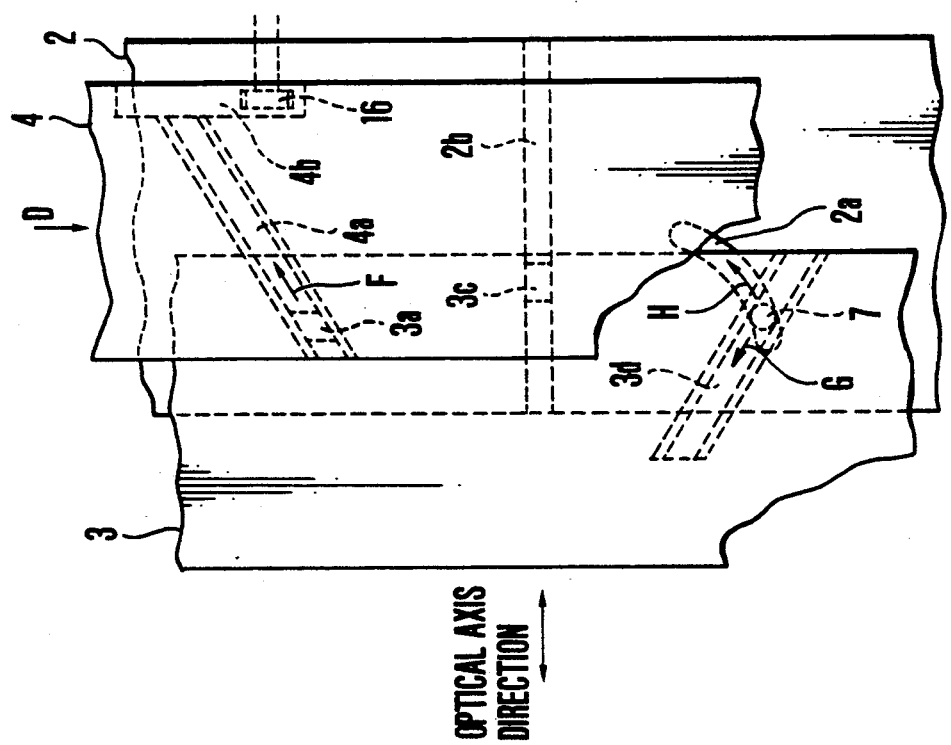
FIG. 4 is a developed plan view showing the tubular part of the zoom lens barrel in a long focal length position.
Figure 6:
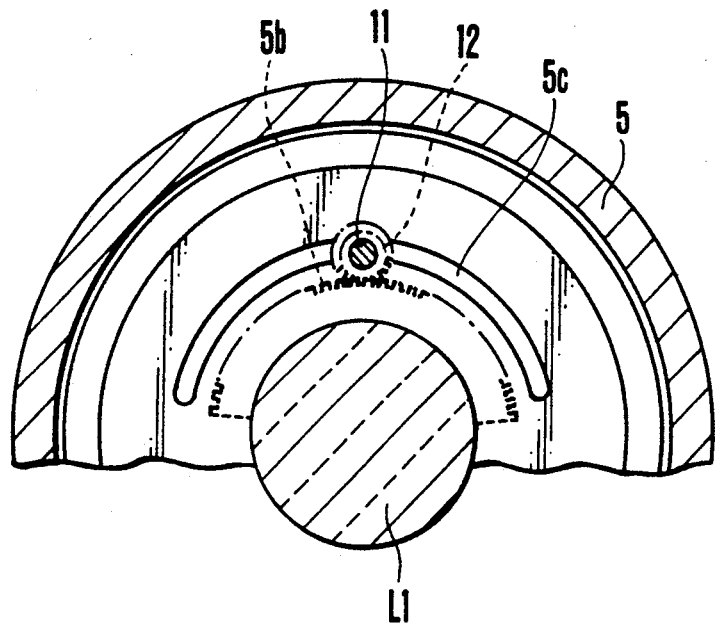
FIG. 6 is a sectional view taken along a line J—J of FIG. 1.
Figure 7:
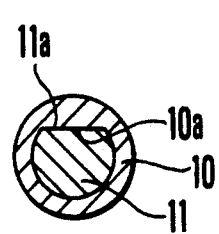
FIG. 7 is a sectional view taken along a line B—B of FIG. 2.
Figure 8:
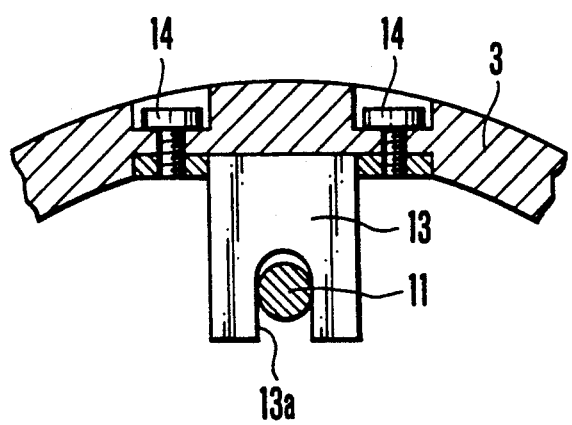
FIG. 8 is a sectional view taken along a line K—K of FIG. 1.

A first embodiment of the invention is arranged as described below with reference to FIGS. 1 through 12:

FIG. 1 is a vertical sectional view showing the essential parts of a zoom lens barrel which is arranged as the first embodiment. FIG. 2 shows in a developed plan view the structural parts of the lens barrel which are related to this invention. FIG. 3 is a sectional view taken along an arrow line A—A of FIG. 2. FIGS. 4 and 5 are developed plan views of a zoom mechanism. FIG. 6 is a front view showing in outline a part of the structural arrangement shown in FIG. 1. FIG. 7 is a sectional view of a driving shaft system included in the structural arrangement shown in FIG. 1. FIG. 8 shows in detail a part of the arrangement shown in FIG. 1.

Referring to FIG. 1, a known mount 1 is arranged to be detachably attached to a camera body which is not shown. A fixed tube 2 is secured to the mount 1 by means of screws 22. An external tube 21 is secured to the outer circumferential side of the fixed tube 2 by means of screws 23. A straight moving tube 3 is fitted on the outer circumferential part of the fixed tube 2 in such a way as to be only axially shiftable. A zoom driving ring 4 is disposed on the outside of the straight moving tube 3 and is rotatable relative to the fixed tube 2. A first moving lens barrel 5 is disposed on the outside of the straight moving tube 3 and on the outside of the zoom driving ring 4 and is in screwed engagement with the straight moving tube 3. A second moving lens barrel 6 is disposed on the inside of the fixed tube 2 and is arranged to be axially movable by engaging the fixed tube 2 and the straight moving tube 3 through cam engagement as will be described later. A known diaphragm mechanism 17 is secured to the fixed tube 2 by means of screws 19. A diaphragm driving motor 18 is formed in one body with the diaphragm mechanism 17. A first lens group L1 is secured to the first moving lens barrel 5. A second lens group L2 is secured to the fore end part of the fixed tube 2. A third lens group L3 is secured to the fore end of the second moving lens barrel 6. A fourth lens group L4 is secured to a middle part of the fixed tube 2. A fifth lens group L5 is secured to the rear end of the second moving lens barrel 6. A driving unit 9 is disposed within an annular space provided on the outside of the rear part of the fixed tube 2. A connection terminal group 20 is arranged on the side of the zoom lens barrel to communicate and exchange power supply with the camera body which is not shown.

The component members described above are interconnected as follows: Further, on the upper surface of the external tube 21, there are provided a telephoto button 123 and a wide-angle button 124 for a power varying action. Mechanisms related to the two buttons are disposed in a space between the external tube 21 and the upper outer circumferential side of the first moving lens barrel 5. These mechanisms will be described in detail later.

A curved cam slot 2a and an axial groove 2b are provided in the circumferential wall of the fixed tube 2 as shown in FIG. 4. Meanwhile, an oblique groove 3d is formed to have a lead angle as shown in FIGS. 1 and 4 in the inner circumferential side of the straight moving tube 3 which is disposed outside of the fixed tube 2. A follower roller 7 which protrudes perpendicularly from the outer circumferential face of the second moving lens barrel 6 is inserted into the cam slot 2a of the fixed tube 2 and the oblique groove 3d of the straight moving tube 3 in such a way as to be movable relative to them. The follower roller 7 is in a tubular shape and is rotatably fitted on a shaft screw 8 which is secured to and protrudes from the outer circumferential face of the second moving lens barrel 6.

A protruding part 3a is formed on the rear outer circumferential part of the straight moving tube 3. As shown also in FIG. 4, this protruding part 3a is slidably inserted into an oblique groove 4a provided in the inner circumferential face of the zoom driving ring 4. A thread part 3b which is formed on the outside of the fore end part of the straight moving tube 3 is screwed into a thread part 5a formed inside of the fore end part of the first moving lens barrel 5.

Further, a protruding part 3c is provided on the inside of the rear end part of the straight moving tube 3. The protruding part 3c is slidably fitted in the axial groove 2b of the fixed tube 2 as shown also in FIG. 4. A gear part 4b is formed on the inside of the rear end part of the zoom driving ring 4. A gear 16 is arranged to engage the gear part 4b. The gear 16 is secured to the fore end of a shaft 15. The shaft 15 is arranged to be driven to rotate by a driving unit 9 as will be described later on.

At the rear end of the zoom driving ring 4, there is formed a bayonet engagement groove 4c in the circumferential direction for connecting the ring 4 to the fixed tube 2 by bayonet coupling (detachable coupling). The ring 4 is also provided with a bayonet coupling projection 4d which is formed to engage a bayonet coupling groove 2c formed in the fixed tube 2. In other words, the zoom driving ring 4 is rotatably carried by the fixed tube 2 through this bayonet coupling arrangement.

An arcuate groove 5c which extends in the circumferential direction as shown in FIG. 6 is formed on the outside of the lens carrying part of the first moving lens barrel 5. A shaft 11 which carries a gear 12 is inserted into the groove 5c in such a way as to be slidable along the groove 5c. The gear 12 engages a gear part 5b which is formed on the first moving lens barrel 5 and extends in parallel to the groove 5c. As will be further described later, when the shaft 11 is rotated, the first moving lens barrel 5 is rotated on an optical axis and the shaft 11 is slidden relative to the lens barrel 5 in the circumferential direction within the groove 5c and around the optical axis.

The shaft 11 which is secured to the gear 12 is provided for the purpose of transmitting a driving force required for focusing. The shaft 11 extends in parallel to the optical axis within the inside space of the fixed tube 2. With the exception of its fore end part, the major part of the shaft 11 is inserted within a tubular shaft 10 which will be described later on. FIG. 7 shows in a cross sectional view the shape of a part of the shaft 11 at which the shaft 11 is in fitted engagement with the tubular shaft 10. As shown, a flat part 10a formed on the inner circumferential side of the shaft 10 is in planar contact with a flat part 11a formed on the outer circumferential side of the shaft 11. When a rotating force is applied, the two shafts 10 and 11 rotate together. However, they are arranged to move relative to each other in the axial direction.

The fore end part of the shaft 11 is rotatably carried by a bearing member 13 as shown in FIGS. 1 and 8. As shown in FIG. 8, the bearing member 13 is provided with a forked part 13a which slidably engages the outer circumferential face of the shaft 11 and is secured to the straight moving tube 3 with screws 14 as shown in FIG. 8. The rear end part of the tubular shaft 10 is carried by a bearing hole provided in a driving unit carrying frame which will be described later in such a way as to be only rotatable. A gear 128 which will be described later is secured to the rear end of the shaft 10.

Next, the structural arrangement which is related to this invention is described as follows with reference to FIGS. 1, 2 and 3: Referring to these figures, the telephoto button 123 is arranged to be pushed by the camera operator in shifting a photo-taking optical system in the direction of obtaining a longer focal length. The wide-angle button 124 is arranged to be pushed in shifting the photo-taking optical system in the direction of obtaining a shorter focal length. A power varying button support member 125 is made of an elastic material and is arranged to warp to permit these buttons to move downward only when they are pushed down. A moving plate 119 is provided with a slant face 119a which is arranged to be in sliding contact with the slant face 123b of the leg part 123a of the telephoto button 123; a slant face 119b which is in sliding contact with the slant face 124b of the leg part 124a of the wide-angle button 124; and a bent part 119c which is formed in the rear end part. The moving plate 119 is arranged to be shiftable in parallel to the optical axis. A change-over gear carrying shaft 117 has a flange 117a formed in its intermediate part and is arranged to be shiftable in the optical axis direction along with the moving plate 119 in a state of being carried by the bent part 119c of the latter. A driving unit carrying frame 101 is arranged to carry the gear group, the motor, etc., of the driving unit 9. A change-over gear 118 is attached to the rear end of the change-over gear carrying shaft 117 in such a way as to be only rotatable. A spring 120 is loosely fitted on the change-over gear carrying shaft 117 at a point between the flange 117a and the bent part 119c of the moving plate 119 and is arranged to constantly urge the shaft 117 to move rearward (or to the left as viewed in FIGS. 1 to 3).

The driving unit carrying frame 101 has an extending part which extends in the circumferential direction of the first moving lens barrel 5 within a space existing between the external tube 21 and the upper outer circumferential face of the first moving lens barrel 5 and an axially extending part which extends forward in parallel to the axis of the lens barrel. As shown in FIG. 2, the frame 101 is connected to the fixed tube 2 at the two ends of the circumferential extending part by means of screws 102 and 103.

The circumferential extending part is provided with, as shown in FIG. 2, a hole 101g which is arranged to carry the change-over gear carrying shaft 117; a hole 101h which is arranged to carry the above-stated shaft 10; a hole 101i which is arranged to carry the above-stated shaft 15; a hole 101f which is arranged to mount a motor 104; and five gear mounting shafts 101a to 101e which are inserted into the extending part. The other end of each of the gear mounting shafts 101a to 101e is secured to a cover/bearing plate 113 which is opposed to the frame 101. A group of driving unit forming gears which are loosely fitted on the above-stated gear mounting shafts 101a to 101e are disposed within a space existing between the frame 101 and the cover/bearing plate 113.

FIG. 2 further shows a pinion 105 which is secured to the shaft of the motor 104; a known pulse plate 106 which has teeth 106a formed along its peripheral edge and is secured to the pinion 105; known rotating degree detecting means 107 which is secured to the frame 101 and consists of a light projecting part 107a and a light receiving part 107b; a stepped gear 108 consisting of a large gear part which is arranged to engage the pinion 105 and a small gear part which is arranged to engage a gear 109, the stepped gear 108 being loosely fitted on the gear mounting shaft 101a; the gear 109 consisting of a small gear part which constantly engages the change-over gear 118 and a large gear part which engages the small gear part of the gear 108, the gear 109 being loosely fitted on and carried by the gear mounting shaft 101b; a gear 115 which is rotatably fitted on a shaft 114 fixed to the cover 113 and is arranged in alignment with a gear 128; a gear 110 which is loosely fitted on the gear mounting shaft 101c and engages with a gear 111; the gear 111 which is loosely fitted on the gear mounting shaft 101d and engages the gear 110 and another gear 112; the gear 112 which is loosely fitted on the gear mounting shaft 101e and engages the gear 111 and a gear 116; and the gear 116 which is secured to a shaft 15.

The shift 15 is provided for the purpose of transmitting a zoom driving force.

The above-stated change-over gear 118 is arranged to selectively engage either a gear 128 or the gear 115 when the moving plate 119 is moved in parallel to the optical axis. The axial extending part of the driving unit carrying frame 101 which extends forward in parallel to the axis 11 is formed in a flat box-like shape including side wall parts and a front wall part as shown in FIGS. 1 and 3. Guide rail parts 101j and 101k are formed along the upper edges of the side wall parts. Engaging parts provided at the two ends of a spring 127 engage a spring hooking hole 101( formed in the front wall part of the frame 101 and a spring hooking hole 119d provided in the bent part 119c of the moving plate 119 respectively. The moving plate 119 is thus urged to move forward by the spring 127.

Further, as shown in FIGS. 1 and 3, a guide plate 121 is fixedly disposed on the flat box-like part of the frame 101. The guide plate 121 is provided with a square hole 121a for inserting the leg part 123a of the telephoto button 123 and a square hole 121b for inserting the leg part 124a of the wide-angle button 124. A power varying button support member 125 is secured to the upper part of the guide plate 121 and is arranged to carry the above-stated two buttons. A flexible printed circuit board 126 is mounted on the guide plate 121. On the printed circuit board 126 are formed conductive patterns 126a and 126b which form a power varying direction detecting switch and are disposed just below the telephoto button 123 and the wide-angle button 124 respectively. Meanwhile, the power varying button support member 125 is provided with a conductive projection 125a which is formed below the telephoto button 123 and is arranged to come into contact with the conductive pattern 126a and a conductive projection 125b which is formed below the wide-angle button 124 and is arranged to come into contact with the conductive pattern 126b. The conductive pattern 126a and the conductive projection 125a jointly form a switch for detecting a power varying action performed in the telephoto direction. The conductive patter 126b and the conductive projection 125b jointly form a switch for detecting a power varying action in the wide-angle direction. The flexible printed circuit board 126 is electrically connected to a microcomputer which is disposed within the zoom lens barrel arranged according to this invention. The motor 104 and a diaphragm driving motor 18 (see FIG. 1) are also connected to the microcomputer.

A switch mount part 101m is formed on the circumferential extending part of the driving unit carrying frame 101 and protrudes forward (to the left as viewed in FIG. 2). Switch pieces 129 and 130 are mounted on the switch mount part 101m through an insulation plate 131 by means of a screw 132. The fore end 129a of the switch piece 129 is arranged to be constantly in contact with the rear side of the bent part 119c of the moving plate 119. The fore end 130a of the switch piece 130 is disposed in the rear of the fore end part 129a of the switch piece 129. When the change-over gear 118 is in a state of engaging the gear 128 as shown in FIG. 2, the fore end 130a of the switch piece 130 stays at a given distance away from the switch piece 129.

The switch pieces 129 and 130 jointly form a switch for detecting the shifting state of the change-over gear 118. The change-over gear shifting state detection switch is also electrically connected to the above-stated microcomputer, which is arranged as follows:

The microcomputer which is disposed within the invented zoom lens barrel is electrically connected to a microcomputer disposed within a camera body (not shown) via a connection terminal group 20 (FIG. 1) which is disposed on the rear side of the mount 1. The microcomputer of the lens barrel and that of the camera body control a start, a stop and the rotating direction of the motor 104 and the operation of the diaphragm driving motor 18 according to a detection signal obtained from the change-over gear shifting state detecting switch (formed by the switch pieces 129 and 130) and a detection signal which is obtained from the power varying direction detecting switch (see FIG. 3).

Figure 9:
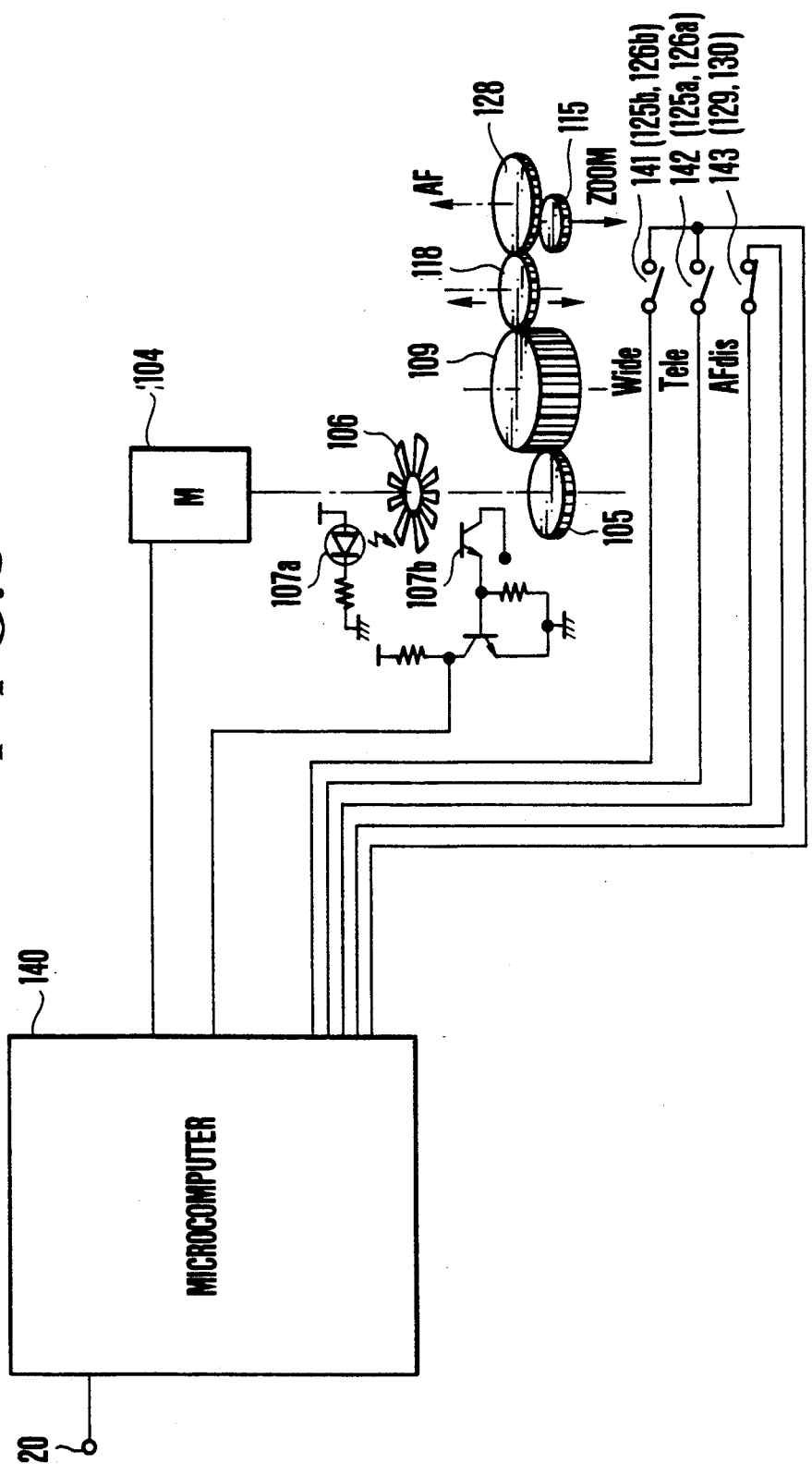
FIG. 9 shows in outline the arrangement of a control system related to the lens driving mechanism of the zoom lens barrel.

FIG. 9 shows in outline a control system for controlling the zooming and focusing driving actions of the zoom lens barrel of this embodiment. Referring to FIG. 9, a switch 141 which closes when the wide-angle button 124 (FIG. 3) is pushed down is composed of the conductive projection 125b and the conductive pattern 126b. A switch 142 which closes when the telephoto button 123 is pushed down is composed of the conductive projection 125a and the conductive pattern 126a. A switch 143 is composed of the switch pieces 129 and 130 (FIG. 1) and is arranged to be closed by bringing into contact the fore end 129a of the switch piece 129 and the fore end 130a of the switch piece 130 with each other. A reference numeral 140 denotes the microcomputer which is disposed within the zoom lens barrel. A numeral 106 denotes the pulse plate. A numeral 107a denotes a light projecting part of rotation degree detecting means which is composed of the above-stated pulse plate, a light emitting diode, etc. A numeral 107b denotes a light receiving part of the rotation degree detecting means which is formed by a photo-transistor. A numeral 118 denotes the change-over gear which is axially shiftable. A last-step gear 109 disposed on the side of the motor is arranged to constantly engage the change-over gear 118. A gear 115 is arranged to come to engage the change-over gear 118 only when a power varying operation is performed. A gear 128 is arranged to transmit the driving force of the motor 104 to a focusing driving shaft (a shaft 10 shown in FIG. 2) when no power varying operation is performed.

The action of each part of the zoom lens barrel of this embodiment is described below with reference to FIGS. 1 to 12:

(i) When no power varying operation is performed

The zoom lens barrel remains in the state as shown in FIGS. 2 and 3 when no power varying operation is performed. With neither the telephoto button 123 nor the wide-angle button 124 pushed as shown in FIGS. 2 and 3, the tension spring 127 arranged between the hole 119d of the moving plate 119 and the spring hooking hole 101i of the driving unit carrying frame 101 is urging the moving plate 119 to move to the left as viewed in FIG. 2. The change-over gear carrying shaft 117 which is carried by the moving plate 119 and the change-over gear 118 which is rotatably carried by the shaft 117 are also urged and are in their positions to have the gear 128 engaging the gear 118 as shown in FIG. 2.

In the case of focusing, the driving (rotating) force of the motor 104 is transmitted to pinion 105 and the gears, 108 and 109, the change-over gear 118 and the gear 128. Then, the driving force is transmitted from the shaft 10 to the gear 12 which is arranged in one unified body with the shaft 11. The rotating force thus transmitted to the gear 12 is transmitted to the gear part 5b of the first moving lens barrel 5. The threaded part 5a of the first moving lens barrel 5 is in screwed engagement with the threaded part 3b of the straight moving tube 3. Therefore, the first moving lens barrel 5 moves in the direction of the optical axis while rotating together with the first lens group L1. The gear 12 is then shiftable relative to the circumferential groove 5c of the first moving lens barrel 5 while retaining its engagement with the gear part 5b. Further, the shaft 11 is axially movable relative to the shaft 10. Therefore, the shaft 11 and the gear 12 come to axially move along with the first moving lens barrel 5 while continuing their rotation.

An automatic focusing action is thus performed with the first lens group L1 moved in the direction of the optical axis. The action of each part performed in the case of a power varying operation is as follows:

(ii) When a power varying operation is performed toward a longer focal length (in the telephoto direction)

Under the condition of FIG. 3, when the telephoto button 123 is manually pushed down, the slant face 119a of the moving plate 119 is pushed backward by the slant face 123b of the leg part 123a of the telephoto button 123. The moving plate 119 moves rearward (to the right) from its position of FIG. 3. When the moving plate 119 begins to move rearward, the change-over gear carrying shaft 117 which is carried by the plate 119 and the change-over gear 118 which is carried by the shaft 117 also begin to move rearward. While the change-over gear 118 is still sufficiently engaging the gear 128 in the initial stage of this movement, the fore end part 129a of the first switch piece 129 comes into contact with the fore end part 130a of the second switch piece 130. With the switch piece 129 coming into contact with the switch piece 130, the switch 143 of FIG. 9 is closed to produce a signal. This signal is supplied to the microcomputer 140. In response to this signal, the microcomputer 140 inhibits the driving action of the motor 104. After this, the change-over gear 118 disengages from the gear 128. The change-over gear 118 then comes to a position where it begins to engage the gear 115 after a state of not engaging both the gears 128 and 115. In this instance, if there is any discrepancy in phase between the teeth of the change-over gear 118 and those of the other change-over gear 115, the end face of a tooth of the change-over gear 118 comes to impinge upon that of the gear 115. This causes the change-over gear 118 to be pushed forward in the optical axis direction by the reaction force of the gear 115. As a result, the change-over gear carrying shaft 117 is also pushed forward in the optical axis direction. Therefore, the spring 120 is contracted. Then, the resilient force of the spring 120 pushes the change-over gear 118 rearward in the optical axis direction.

After this, when the telephoto button 123 is completely pushed down, the conductive projection 125a of the power varying button support member 125 comes into contact with the conductive pattern 126a formed on the flexible printed circuit board 126. The switch 142 of FIG. 9 is thus turned on. When turning on of the switch 142 is detected by the control circuit 140, the control circuit 140 causes the motor 104 to start. The rotation of the motor 104 is transmitted via the pinion 105, the gear 108 and the gear 109 to the change-over gear 118. The change-over gear 118 begins to rotate.

When the rotation of the change-over gear 118 causes the phase of the teeth of the gear 118 to come to coincide with that of the gear 115, the force of the spring 120 causes the change-over gear 118 to engage the gear 115. After the engagement of these gears, the driving force of the motor 104 is transmitted to the gears in the sequence of the pinion 105, the gear 109, the change-over gear 118, the gear 115, the gear 110, the gear 111, the gear 112 and the gear 116. As a result, the shaft 15 is rotated. Then, the gear 16 causes the zoom driving ring 4 to rotate in the direction of arrow C as shown in FIG. 5. As a result, the photo-taking optical system is moved toward a longer focal length position in the following manner:

With the zoom driving ring 4 rotated in the direction of arrow C as shown in FIG. 5, the projection 3a of the straight moving tube 3 which is fitted in the oblique groove 4a receives a rotating force from the side wall of the oblique groove 4a. However, the straight moving tube 3 is unable to rotate as its projection 3c is fitted into the axial groove 2b. Therefore, the rotating force applied from the oblique groove 4a to the projection 3a brings about a force which causes the straight moving tube 3 to make an axial motion. This causes the straight moving tube 3 to move forward (to the left) in parallel to the optical axis as shown in FIG. 5. The first moving lens barrel 5 which is in screwed engagement with the straight moving tube 3 also moves forward together with the tube 3. The forward movement of the straight moving tube 3 from its position shown in FIG. 5 causes the follower roller 7 which is fitted into the oblique groove 3d of the tube 3 to move relative to the groove 3d in the longitudinal direction of the latter. In addition to this, the roller 7 receives from the tube 3 a force of moving it within the cam slot 2a of the fixed tube 2 in the direction of arrow E. Therefore, the second moving lens barrel 6 which carries the third lens group L3 and the fifth lens group L5 moves in the direction of the optical axis while rotating to a slight degree. The above-stated series of actions change the relative positions of the fixed tube 2, the straight moving tube 3 and the zoom driving ring 4 from a short focal length position shown in FIG. 5 to a long focal length position shown in FIG. 4. As a result, the first lens group L1, the third lens group L3 and the fifth lens group L5 are shifted.

Figure 10:
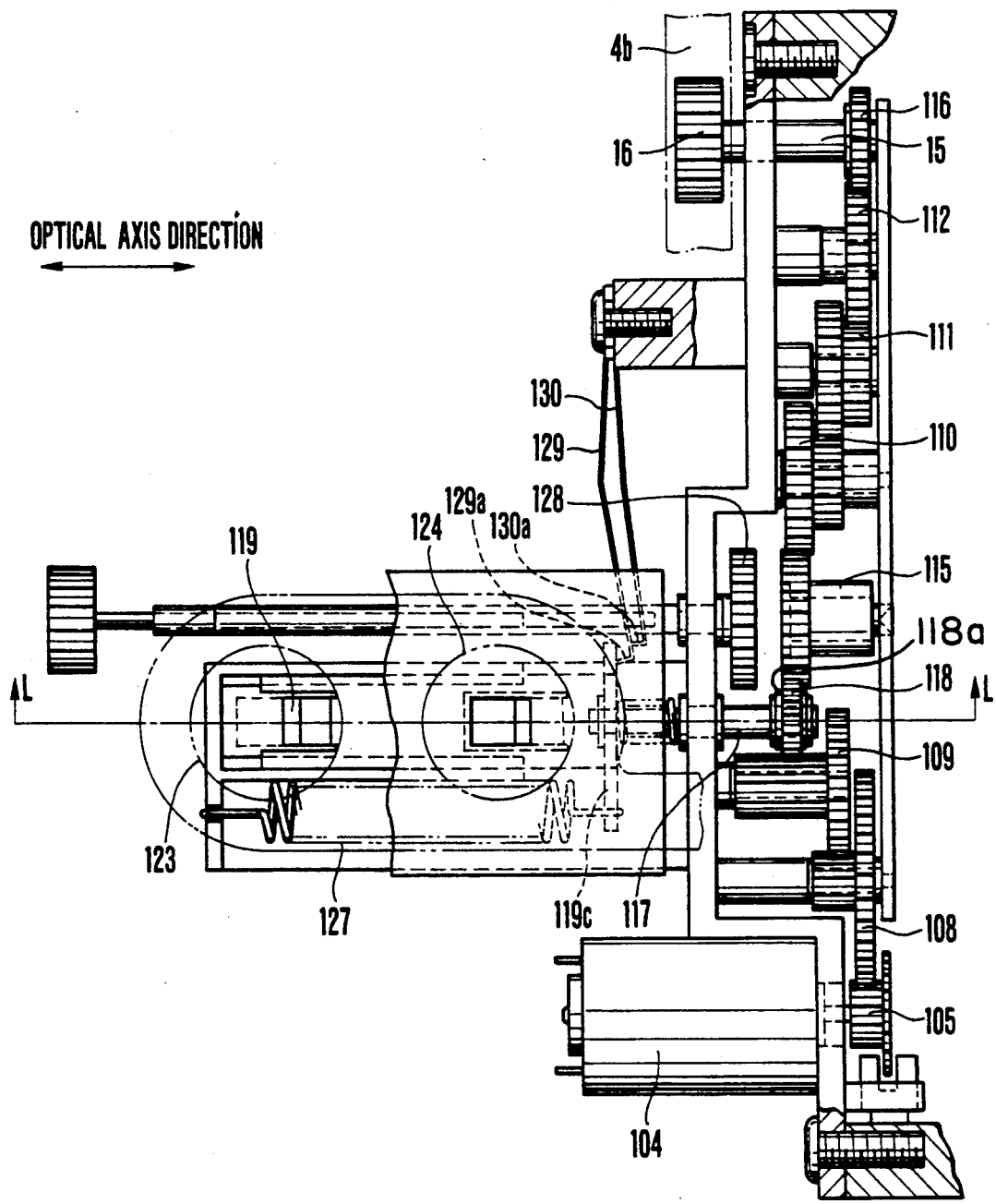
FIG. 10 is a developed plan view showing the lens driving mechanism in a state of performing a power varying action in the direction of obtaining a longer focal length.
Figure 11:
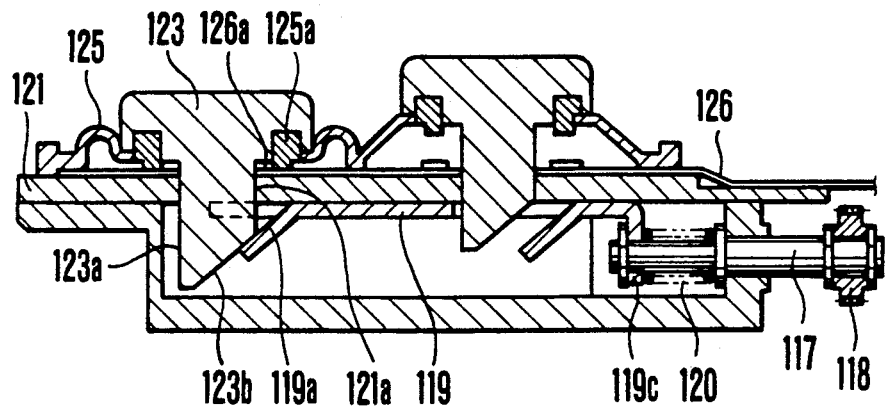
FIG. 11 is a sectional view taken along a line L—L of FIG. 10.

Next, in a case where a focusing action follows the above-stated zooming toward a longer focal length, each part of the zoom lens barrel acts as follows:

(iii) When a focusing action is performed after the completion of the power varying action in the telephoto direction When the photographer ceases to push the telephoto button 123, the pulling force of the tension spring 127 causes the moving plate 119 to begin to move to the left from its position of FIGS. 10 and 11. At the same time, the slant face 123b of the telephoto button 123 is pushed up by the first slant face 119a of the moving plate 119. The telephoto button 123 thus begins to be brought back to its initial position by the button support member 125.

When the moving plate 119 begins to move to the left from its position of FIG. 10, the change-over gear 118 also begins to move to the left from its position of FIG. 10. However, while the change-over gear 118 and the gear 115 are still engaging each other in the initial stage of the movement of the gear 118, the first conductive projection 125a of the power varying button support member 125 moves away from the first conductive pattern 126a of the flexible printed circuit board 126. This turns off the switch 142 of FIG. 9 from its on-state. The turning-off of the switch 142 is detected by the microcomputer 140. In response to this, the microcomputer 140 causes the rotation of the motor 104 to be brought to a stop. (The telephoto button 123 is pushed continuously to rotate the motor 104 for zooming until immediately before this point of time.)

When the moving plate 119 further moves forward after the motor 104 is brought to a stop, the change-over gear 118 completely disengages from the gear 115. After that, the gear 118 comes, through a state of not engaging the gears 115 and 128 at all, to a position where its chamfered part 118a comes into contact with the chamfered part 128a of the gear 128. Then, when the phases of the two gears come to coincide with each other, the two gears begin to engage with each other. When the change-over gear 118 further advances to completely engage the gear 128, the fore end part 129a of the switch piece 129 parts from the fore end part 130a of the switch piece 130. The switch 143 of FIG. 9 thus turns off from its on-state. Upon detection of turning-off of the switch 143, the microcomputer 140 cancels the inhibition of driving by the motor 104. The microcomputer 140 then waits for an instruction from the microcomputer disposed within the camera body. The motor 104 becomes drivable for focusing. In the case of focusing, the embodiment performs the operation described in Para. (i).

(iv) In performing a power varying operation for a shorter focal length

In performing the zooming operation in the direction of a shorter focal length, the wide-angle button 124 is pushed. The leg part 124a of the wide-angle button 124 is then pushed along the second square hole 121b of the guide plate 121. The slant face 124b pushes the second slant face 119b of the moving plate 119 in the direction of the optical axis (to the right as viewed in FIG. 12) to move the moving plate 119. This causes the change-over gear carrying shaft 117 which is carried by the moving plate 119 and the change-over gear 118 which is carried by the shaft 117 to begin to move to the right from their positions shown in FIG. 2. Then, while the change-over gear 118 and the gear 128 are still engaging each other, the fore end part 129a of the switch piece 129 comes into contact with the fore end part 130a of the switch piece 130. The switch 143 of FIG. 9 then turns on. Upon detection of this, the microcomputer 140 inhibits any driving action on the motor 104.

After this, the change-over gear 118 disengages from the gear 128. Then, there obtains a state in which the gear 118 is engaging neither tee gear 128 nor the gear 115 before the change-over gear 118 comes to a position where the gear 118 begins to engage the gear 115. At this moment, if there is any discrepancy in phase between the teeth of the change-over gear 118 and those of the gear 115, the end face of a tooth of the change-over gear 118 impinges on that of the gear 115. Then, a reaction force of the gear 115 pushes the change-over gear 118 forward in the direction of the optical axis. As a result, the change-over gear carrying shaft 117 is also pushed forward in the optical axis direction. This causes the spring 120 to contract. The resilient force of the spring 120 then strongly pushes the change-over gear 118 rearward in the optical axis direction.

Following that, when the wide-angle button 124 is completely pushed down, the conductive projection 125b of the power varying button carrying member 125 comes into contact with the conductive pattern 126b on the flexible printed circuit board 126. The switch 141 of FIG. 9 then turns on. Upon detection of that, the microcomputer 140 causes the motor 104 to be started. The rotation of the motor 104 is transmitted to the change-over gear 118 via the pinion 105 and the gears 108 and 109. The change-over gear 118 begins to rotate. When the tooth phase of the gear 118 comes to coincide with that of the gear 115, the force of the spring 120 causes the change-over gear 118 to engage the gear 115. Following the engagement, the driving force of the motor 104 is transmitted to the pinion 105 and the gears 109, 118, 115, 110, 111, 112 and 116 one after another. The shaft 15 is rotated. The gear 16 then causes the zoom driving ring 4 to rotate in the direction of arrow D as shown in FIG. 4. As a result, the position of the photo-taking optical system is shifted toward a shorter focal length in the following manner:

With the zoom driving ring 4 rotated in the direction of arrow D, the engaging relation between the projection 3a of the straight moving tube 3 and the oblique groove 4a of the ring 4 causes the projection 3a to shift in the direction of arrow F within the groove 4a. This in turn causes the straight moving tube 3 to move rearward in the optical axis direction (to the right as viewed on FIG. 4). The first moving lens barrel 5 which is in screwed engagement with the straight moving tube 3 also moves to the right together with the tube 3. As a result, the first lens group L1 is moved rearward. When the straight moving tube 3 moves to the right, the follower roller 7 which is disposed within the oblique groove 3d of the straight moving tube 3 is moved relative to the tube 3 within the groove 3d in the direction of arrow G. The follower roller 7, therefore, relatively moves within the cam slot 2a of the fixed tube 2. The second moving lens barrel 6 which is arranged in one body with the follower roller 7 moves rearward (to the right as viewed on FIG. 4) while rotating. The third lens group L3 and the fifth lens group L5 which are carried by the second moving lens barrel 6 move rearward in the direction of the optical axis.

Through the series of actions described, the focal length of the photo-taking optical system is changed from a long focal length over to a short focal length.

Figure 12:
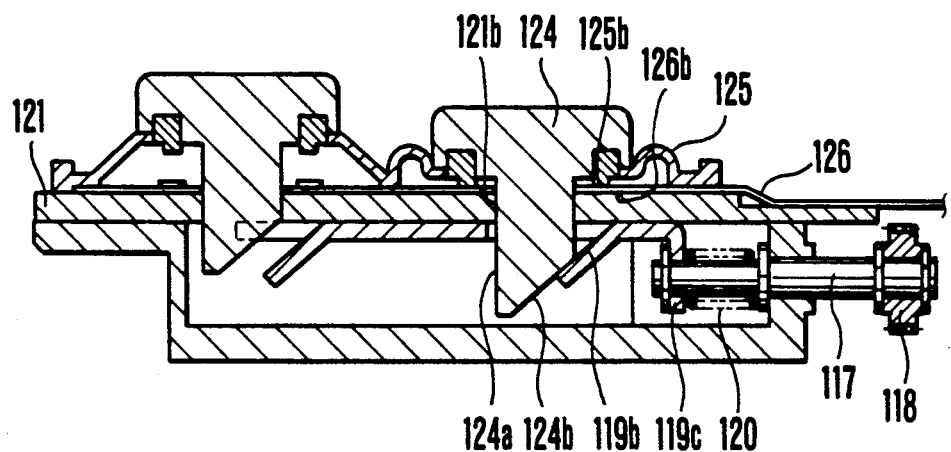
FIG. 12 shows the zoom lens barrel in a state obtained when the power varying operation is performed in the direction of obtaining the short focal length by pushing a wide-angle button.

(v) In performing a focusing action after the power varying action is performed in the wide-angle direction When the photographer ceases to push the wide-angle button 124, the tension spring 127 pulls the moving plate 119 to cause the plate 119 to begin to move to the left from its position shown in FIGS. 10 and 12. At the same time, the second slant face 119b of the moving plate 119 pushes the slant face 124b of the wide-angle button 124. This pushing action in conjunction with the resilient force of the power varying button support member 125 causes the wide-angle button 124 to begin to resume its initial position.

When the moving plate 119 begins to move to the left from its position of FIG. 10, the change-over gear 118 also begins to move to the left from its position of FIG. 10. However, while the change-over gear 118 is still engaging the gear 115 in the initial stage of its movement, the second conductive projection 125b of the power varying button support member 125 comes to move away from the second conductive pattern 126b of the flexible printed circuit board 126. This causes the switch 141 of FIG. 9 to turn off from its on-state. Therefore, upon detection of turning-off of the switch 141, the microcomputer 140 causes the rotation of the motor 104 to be brought to a stop. (The motor 104 is continuously rotating for zooming with the wide-angle button 124 having been pushed until immediately before this point of time.)

When the moving plate 119 further advances after the motor 104 comes to a stop, the change-over gear 118 completely disengages from the gear 115 and there obtains a state in which the gear 118 engages neither the gear 115 nor the gear 128. After that, the chamfered part 118a of the change-over gear 118 comes into contact with the chamfered part 128a of the gear 128. If the phases of the teeth of the two gears coincide with each other under this condition, the two gears begin to engage. When the change-over gear 118 completely engages the gear 128 by further advancing, the fore end part 129a of the switch piece 129 parts from the fore end part 130a of the switch piece 130. The switch 143 of FIG. 9 turns off from its on-state. Upon detection of turning-off of the switch 143, the microcomputer 140 cancels the inhibition of the driving action on the motor 104. The microcomputer 140 waits for an instruction from the other microcomputer which is disposed inside the camera body which is not shown. The motor 104 thus becomes drivable. If it is decided to perform focusing, the embodiment operates in the manner as described in Para. (i) in the foregoing.

Figure 13:
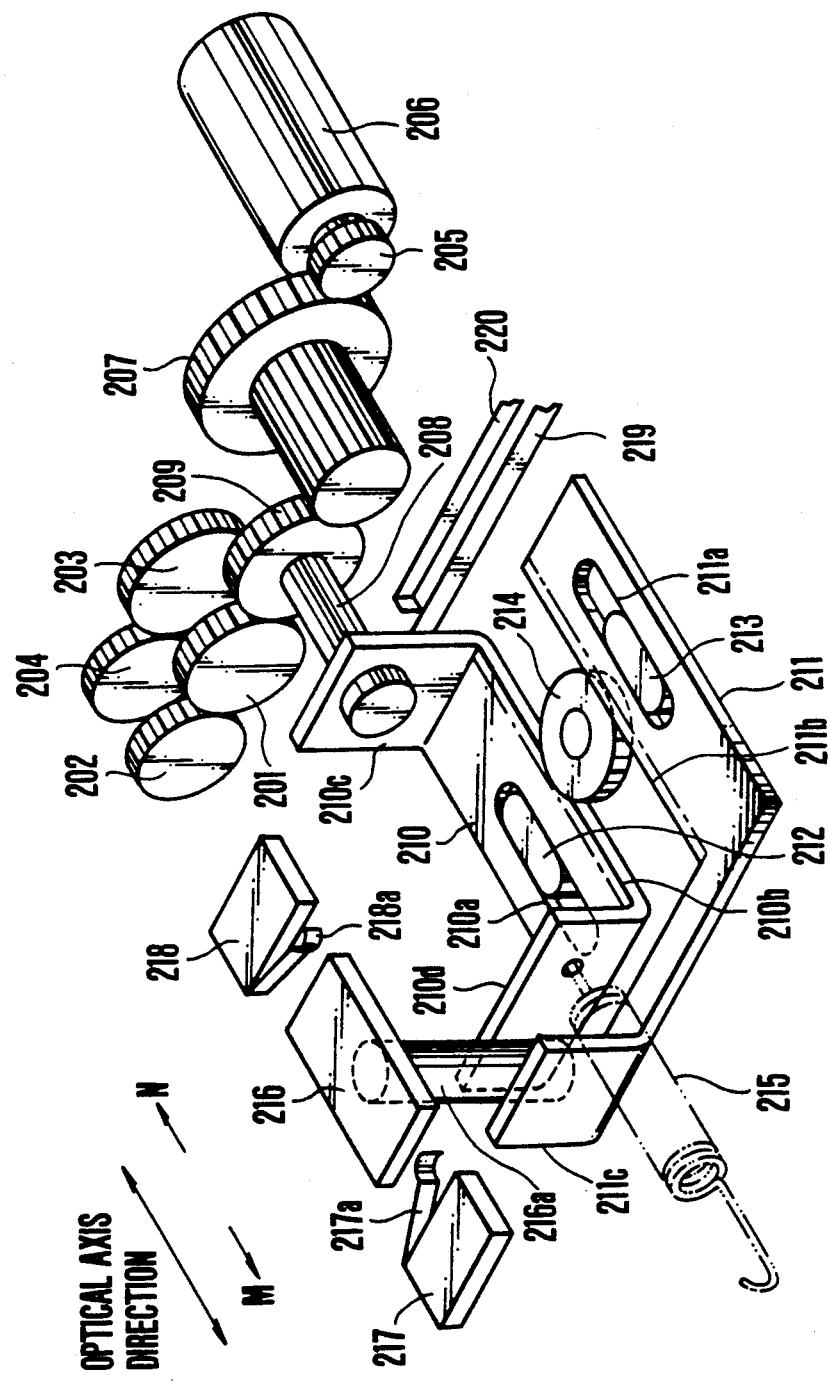
FIG. 13 is an oblique view showing the lens driving mechanism of a zoom lens barrel which is arranged as a second embodiment of the invention and is shown in a state of permitting a focusing action.
Figure 14:
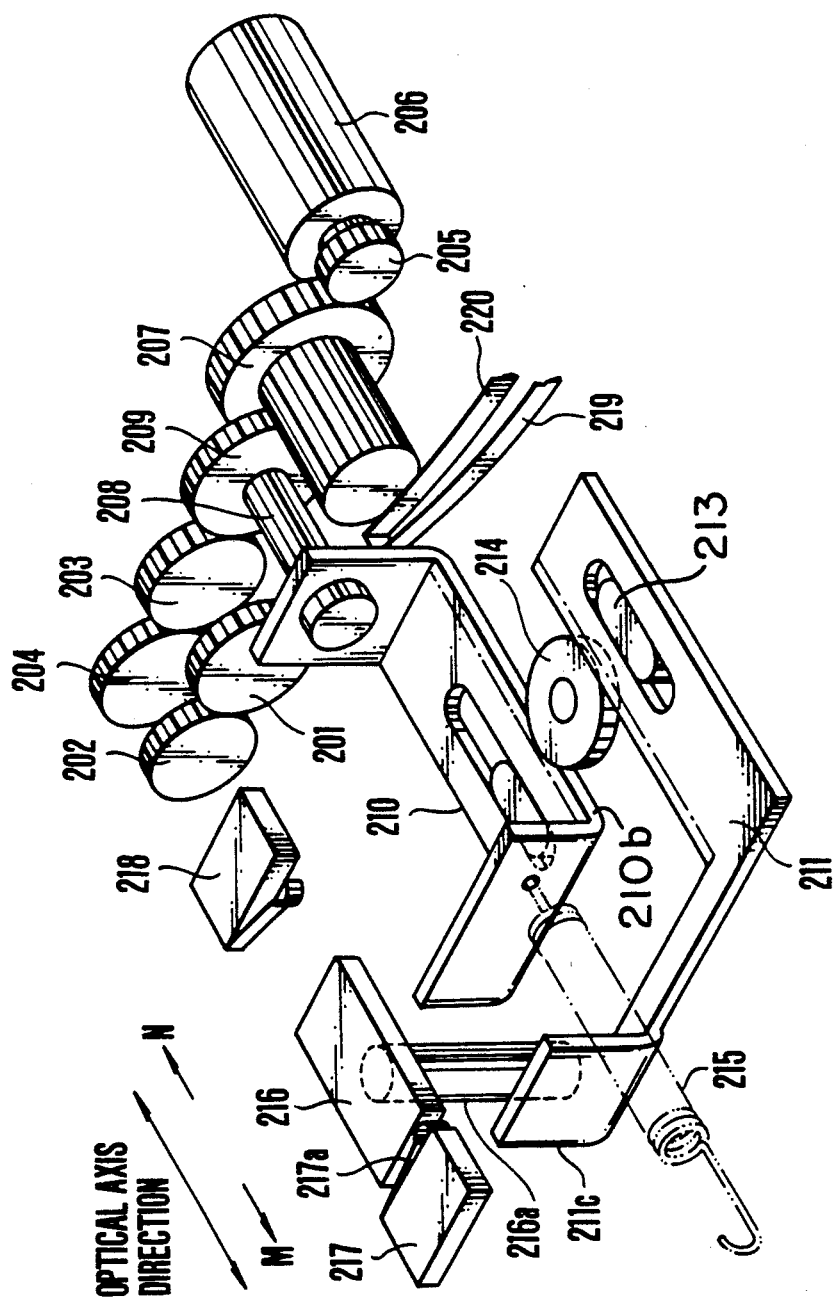
FIG. 14 shows the same mechanism of FIG. 13 in a state of permitting a zoom driving action in the telephoto direction.
Figure 15:
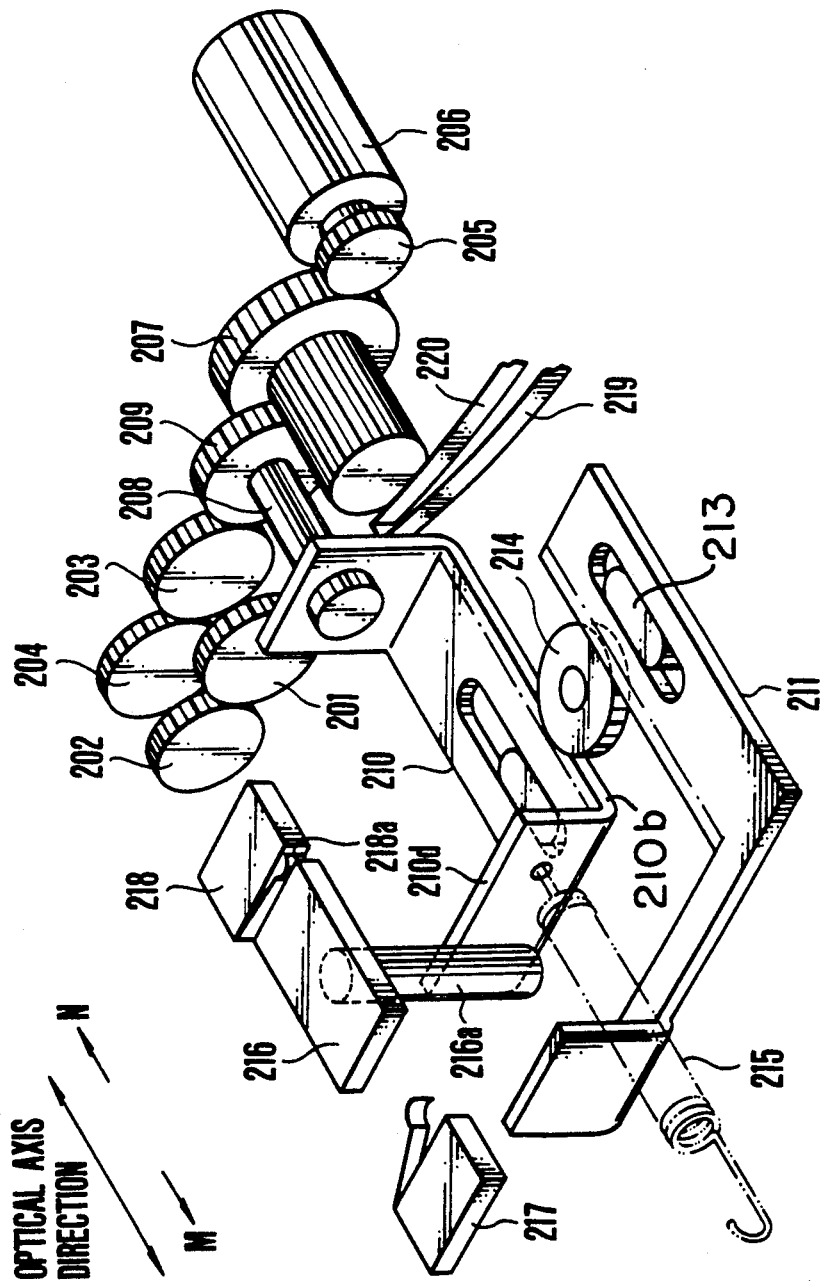
FIG. 15 shows the same mechanism of FIG. 13 in a state of permitting a zoom driving action in the wide-angle direction.

FIGS. 13, 14 and 15 are oblique views showing the essential parts of a zoom lens barrel which is also arranged according to this invention as its second embodiment. Referring to FIG. 13, a focusing driving gear 202 is fixed to the rear end of the tubular shaft 10 which is shown in FIG. 2. The focusing (driving) gear 202 corresponds to the gear 128 of FIG. 2. A zoom driving gear 204 is secured to the shaft 15 which is shown in FIG. 2. The zoom (driving) gear 204 corresponds to the gear 116 of FIG. 2. A change-over gear 209 corresponds to the change-over gear 118 of FIG. 2. A change-over gear carrying shaft 208 corresponds to the change-over gear carrying shaft 117 of FIG. 2. A gear 207 which is the last of a gear train and is disposed on the side of the motor corresponds to the gear 109 of FIG. 2. A gear 201 is arranged to constantly engage the gear 202 and to always engage the change-over gear 209 except when the photo-taking optical system performs a power varying action. A gear 203 is arranged to constantly engage the gear 204 and to engage only when the photo-taking optical system performs a power varying action. A pinion 205 is arranged to constantly engage the gear 207 A motor 206 is identical with the motor 104 of FIG. 2. A first moving plate 210 corresponds to the moving plate 119 of FIG. 2. A tension spring 215 corresponds to the spring 127 of the first embodiment described in the foregoing and is arranged to constantly urge the first moving plate 210 to move forward. A switch piece 219 corresponds to the switch piece 129 of the first embodiment. A switch piece 220 corresponds to the switch piece 130 of the first embodiment. A second moving plate 211 is arranged to be movable in parallel to the optical axis in the same manner as the first plate 210. A gear 214 is arranged to engage rack teeth 210b formed along the edge of the first moving plate 210 and also rack teeth 211b formed along the edge of the second moving plate 211. The gear 214 is rotatably supported by the driving unit carrying frame 101, etc., as mentioned in the foregoing. A power varying operation button 216 is disposed on the upper surface of the external tube 21 (see FIG. 1). The button 216 is arranged to be movable in parallel to the optical axis in the directions of arrows M and N to a given extent. A switch 217 has a switch piece 217a which is arranged to engage the front edge of the power varying operation button 216 when the button 216 is moved in the direction of arrow M. A switch 218 has a switch piece 218a which is arranged to engage the rear edge of the button 216 when the latter is moved in the direction of arrow N.

The power varying operation button 216 is provided with a leg part 216a which perpendicularly protrudes downward. The leg part 216a is interposed in between a perpendicularly bent part 210d which is formed on the front side of the first moving plate 210 and a perpendicularly bent part 211c which is formed on the front side of the second moving plate 211. The first moving plate 210 is constantly urged by the force of a spring 215 to move forward and, in turn, urges the second moving plate 211 via the gear 214 to move backward. Therefore, the power varying operation button 216 is disposed in a neutral position between the first and second moving plates 210 and 211.

Slots 210a and 211a are formed respectively in the first and second moving plates 210 and 211 and extend in parallel to the optical axis. Guide projections 212 and 213 which are provided on the driving unit carrying frame 101 which is not shown (see FIG. 1) or the like are inserted respectively into the slots 210a and 211a and are arranged to be slidable relative to these plates.

Figure 16:
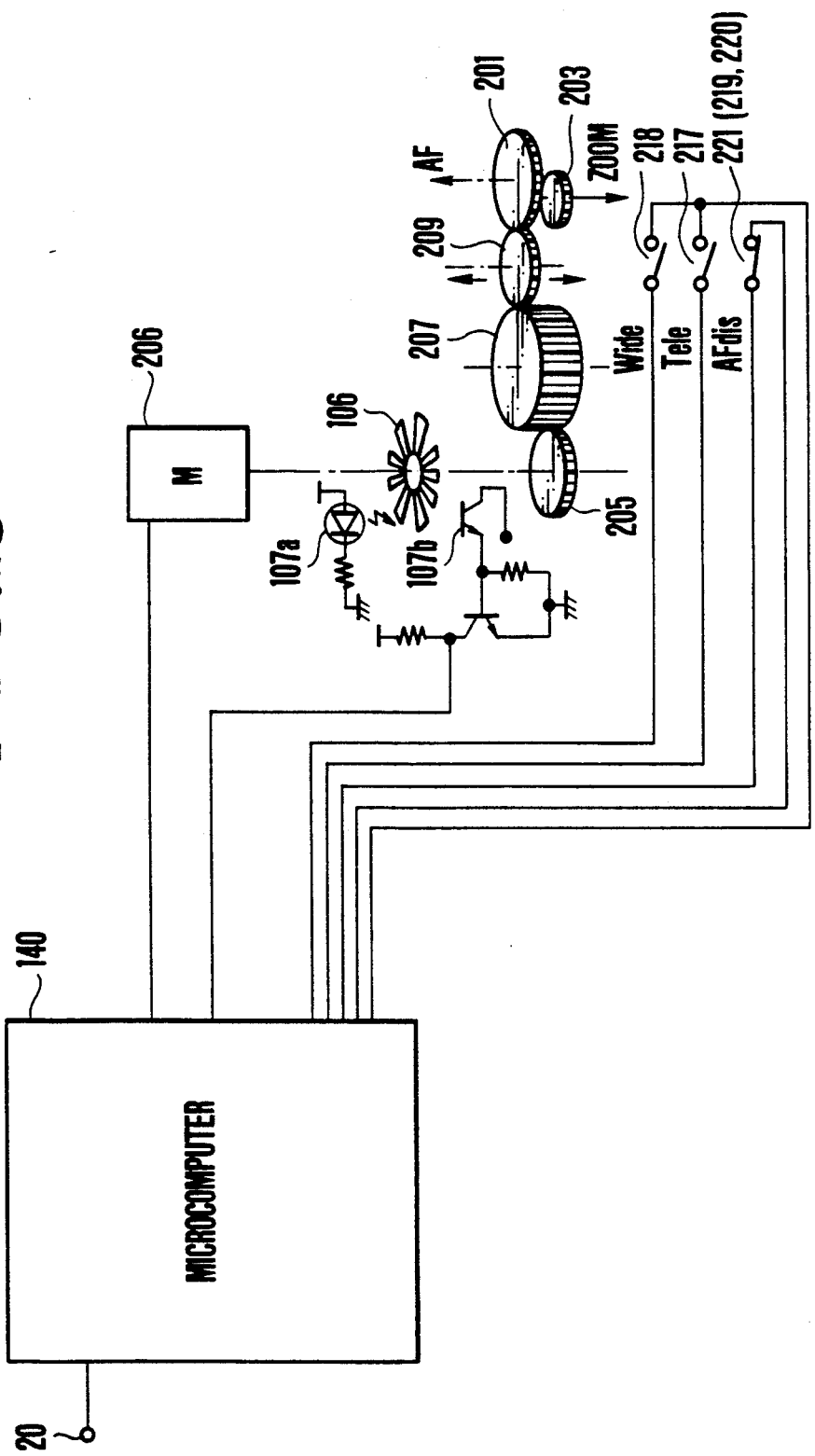
FIG. 16 shows in outline a control system provided for the mechanism shown in FIG. 13.

FIG. 16 shows in outline the driving unit control system of the zoom lens barrel arranged as the second embodiment. The control system is arranged in the same manner as the control system of the first embodiment shown in FIG. 9. Therefore, the same component parts as those of FIG. 9 are indicated by the same reference numerals and the details of them are omitted from description.

Referring to FIG. 16, a switch 221 is composed of switch pieces 219 and 220. Switches 217 and 218 are the switches shown in FIG. 13.

Referring now to FIGS. 13 to 16, the zoom lens barrel arranged as the second embodiment performs focusing/zooming change-over action, etc. as described below:

(vi) In cases where no power varying operation is performed and where a focusing action is performed While the power varying operation is not performed, the power varying operation button 216 is in a neutral position where it is in touch neither with the switch piece 217a nor with the switch piece 218a. The first and second moving plates 210 and 211 and the gears are then in their states as shown in FIG. 13. The driving force of the motor 206 is transmissible to the gear 202 of the focusing driving system under this condition. In the case of focusing, the lens barrel operates in the same manner as the lens barrel of the first embodiment described and thus requires no further description.

(vii) In zooming for a longer focal length

When the photographer moves the power varying operation button 216 in the direction of arrow M along the optical axis as shown in FIG. 13, the leg part 216a of the button 216 moves forward from its position of FIG. 13. Therefore, the leg part 216a comes to move the bent part 211c of the second moving plate 211 forward. The second moving plate 211 is thus moved in the direction of arrow M in parallel to the optical axis while being guided by the guide projection 213. With the second moving plate 211 moved in the direction of arrow M, the gear 214 which engages the rack teeth 211*b* of the second moving plate 211 is rotated clockwise as viewed on FIG. 13. This causes the first moving plate 210 to be moved against the force of the spring 215 in the direction of arrow N which is reverse to the moving direction of the power varying operation button 216 by the rack teeth 210*b* which engages the gear 214. Therefore, the change-over gear carrying shaft 208 which is secured to the first moving plate 210 also moves backward along with the first moving plate 210. Further, the change-over gear 209 which is carried by the shaft 208 also begins to move backward from its position of FIG. 13. Then, while the gears 209 and 201 are still engaging each other immediately after commencement of movement of the change-over gear 209, the switch piece 219 is pushed by the bent part 210 of the first moving plate 210 into contact with the switch piece 220. As a result, the switch 221 of FIG. 16 is turned on. Upon detection of turning-on of the switch 221, the microcomputer 140 inhibits any driving action of the motor 206.

When the power varying operation button 216 is manually shifted further in the direction of arrow M, the change-over gear 209 disengages from the gear 201. Then, there takes place a state in which the gear 209 engages neither the gear 201 nor the gear 203. After that, the gear 209 begins to engage the gear 203.

When the change-over gear 209 comes to completely engage the gear 203, the front edge of the power varying operation button 216 engages the switch piece 217*a*. This turns on the switch 217. Upon detection of turning-on of the switch 217, the microcomputer 140 causes the motor 206 to be driven. With the motor 206 driven to rotate, the rotation of the motor 206 is transmitted to the gears in sequence of the pinion 205, the gear 207, the change-over gear 209, and the gears 203 and 204. as a result, the shaft 15 (FIG. 2) which is in one body with the gear 204 is rotated to drive the photo-taking optical system in the telephoto direction.

When the photographer ceases to push the power varying operation button 216 in the direction of arrow M, the gear 214 no longer exerts any force to move the first moving plate 210 backward. This allows the first moving plate 210 to begin to be moved forward (in the direction of arrow M) by the force of the spring 215. Therefore, the gear 214 which engages the rack teeth 210*a* of the first moving plate 210 begins to rotate counterclockwise as viewed on FIG. 14. Following this, the second moving plate 211 begins to move backward from its position of FIG. 14 The bent part 211*c* of the second moving plate 211 then pushes the leg part 216*a* of the power varying operation button 216 to move it backward from its position of FIG. 14. The button 216 begins to move backward (in the direction of arrow N). As a result, the power varying operation button 216 comes to part from the switch piece 217*a* while the change-over gear 209 is still engaging the gear 203. As a result, the switch 217 of FIG. 16 turns off from its on-state. When the switch 217 turns off, the microcomputer 140 brings the driving action of the motor 206 to a stop. This brings to a stop the zooming action which has been performed in the telephoto direction.

After this, when the first moving plate 210 is moved by the force of the spring 215 further forward, the change-over gear 209 is completely moved away from the gear 203. Then, the change-over gear 209 further moves and comes to engage the gear 201. When the gear 201 completely engages the change-over gear 209, the switch piece 219 is away from the switch piece 220. The switch 221 of FIG. 16 is turned off. Upon detection of turning-off of the switch 221, the microcomputer 140 cancels the inhibition of any driving action on the motor 206. Then, driving for focusing becomes possible at this point of time.

(viii) In zooming for a shorter focal length

In this case, the photographer manually moves the power varying operation button 216 in the direction of arrow N along the optical axis as shown in FIG. 13. The leg part 216*a* of the button 216 is then moved rearward from its position of FIG. 13. This causes the bent part 210*d* of the first moving plate 210 to be moved backward by the leg part 216*a*. The first moving plate 210 is then moved in the direction of arrow N while it is guided by the guide projection 212. With the first moving plate 210 moving in the direction of arrow N, the gear 214 which engages the rack teeth 210*b* of the plate 210 is rotated clockwise as viewed on FIG. 13. The rack teeth 211*b* which engage the gear 214 then cause the second moving plate 211 to move in the direction of arrow N which is reverse to the moving direction of the power varying operation button 216. The change-over gear carrying shaft 208 which is secured to the first moving plate 210 also moves backward together with the first moving plate 210. Further, the change-over gear 209 which is carried by the shaft 208 also begins to move backward from its position of FIG. 13. Then, while the change-over gear 209 is still engaging the gear 201 immediately after commencement of its movement, the switch piece 219 is pushed by the bent part 210*c* of the first moving plate 210 to come into contact with the switch piece 220. As a result, the switch 221 of FIG. 16 turns on. Upon detection of turning-on of the switch 221, the microcomputer 140 inhibits any driving action on the motor 206.

When the power varying operation button 216 is manually shifted further in the direction of arrow N, the change-over gear 209 disengages from the gear 201. Then, there obtains a state in which the gear 209 engages neither the gear 201 nor the gear 203. After this state, the change-over gear 209 begins to engage the gear 203.

When the change-over gear 209 comes to completely engage the gear 203, the rear edge of the power varying operation button 216 engages the switch piece 218*a* as shown in FIG. 15. This causes the switch 218 to turn on. Upon detection of turning-on of the switch 218, the microcomputer 140 allows the motor 206 to be driven. With the motor 206 thus rotated, the rotation of the motor 206 is transmitted in sequence to the pinion 205, the gear 207, the change-over gear 209, the gear 203 and the gear 204. As a result, the shaft 15 which is arranged in one body with the gear 204 (FIG. 2) is rotated to drive and shift the photo-taking optical system in the wide-angle direction.

When the photographer ceases to push the power varying operation button 216 in the direction of arrow N, the backward moving force on the first moving plate 210 ceases to be applied from the power varying operation button 216. This allows the first moving plate 210 to begin to be moved forward by the force of the spring 215 from its position of FIG. 15 (in the direction of arrow M). Therefore, the gear 214 which engages the rack teeth 210b of the first moving plate 210 begins to rotate counterclockwise as viewed on FIG. 15. The second moving plate 211 then begins to move backward from its position of FIG. 15. Meanwhile, the leg part 216a of the power varying operation button 216 is also pushed forward from its position of FIG. 15 by the bent part 210d of the first moving plate 210. The button 216 also begins to move forward in the direction of arrow M. As a result, the power varying operation button 216 parts from the switch piece 218 while the change-over gear 209 is still engaging the gear 203. The switch 218 of FIG. 16 is thus turned on. The microcomputer 140 then brings the driving action on the motor 206 to a stop. This brings the zooming action in the wide-angle direction to an end.

After that, when the first moving plate 210 is moved further forward by the force of the spring 215, the change-over gear 209 completely disengages from the gear 203. Then, the change-over gear 209 moves still further to come to engage the gear 201. When the gear 201 completely engages the change-over gear 209, the switch pieces 219 and 220 part from each other. The switch 221 of FIG. 16 turns off. Upon detection of turning-off of the switch 221, the microcomputer 140 cancels the inhibition of the driving action on the motor 206. This brings the motor 206 into a drivable state for focusing.

FIGS. 17 to 20 are oblique views showing in outline the photo-taking optical system driving mechanism of a zoom lens barrel which is arranged as the third embodiment of this invention. The structural arrangement of the lens barrel part of the third embodiment is identical with that of the first embodiment and is, therefore, omitted from the illustrations.

Figure 17:
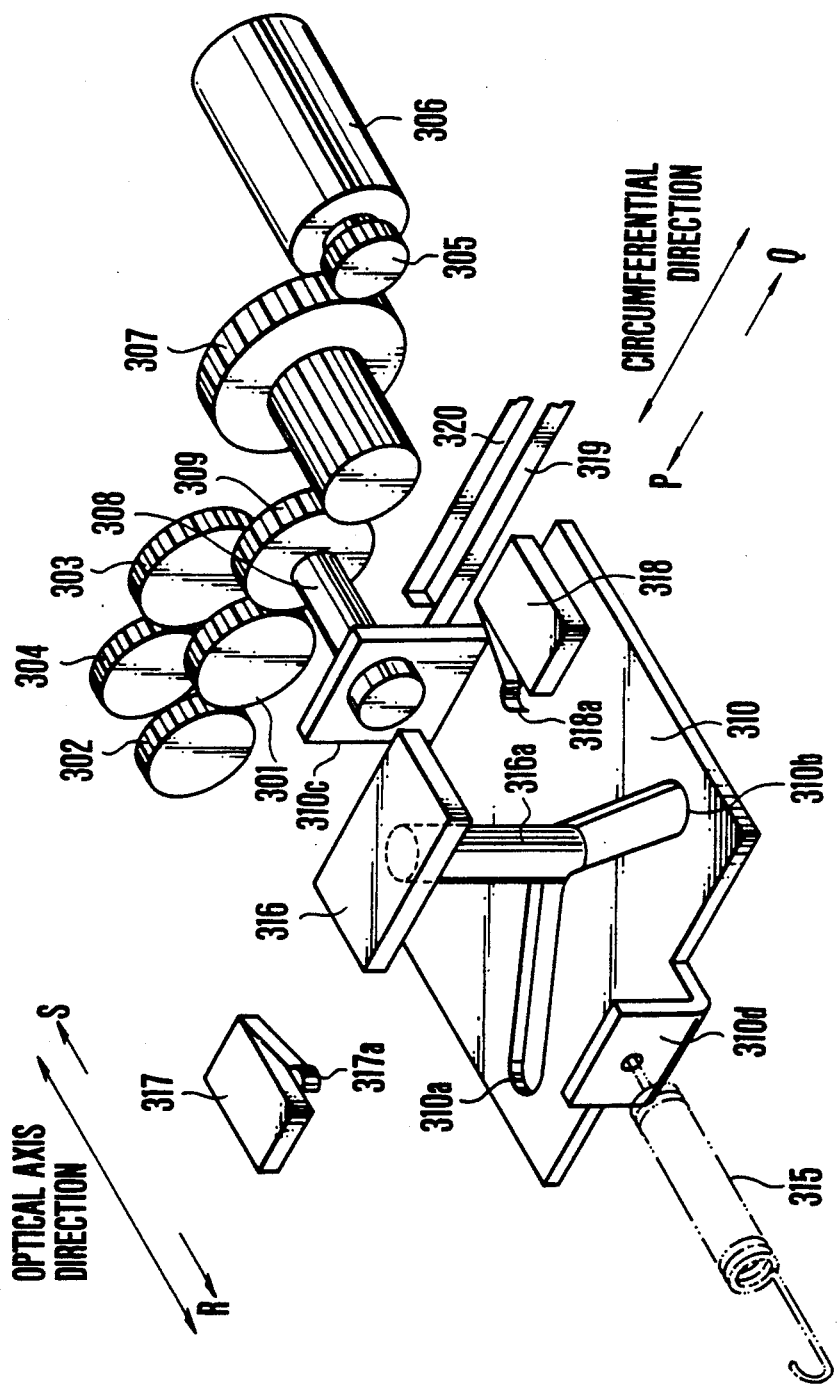
FIG. 17 is an oblique view showing the lens driving mechanism of a zoom lens barrel which is arranged as a third embodiment of the invention and is shown in a state of allowing a focusing action.

FIG. 17 includes a motor 306; a pinion 305; a gear 307 which constantly engages the pinion 305; a change-over gear 309 which is arranged to constantly engage the gear 307 and to be movable in the direction of the optical axis; a change-over gear carrying shaft 308 which is arranged to carry the change-over gear 309 in such a way as to permit its rotation only; a gear 302 which corresponds to the gear 128 of FIG. 2 and is arranged to transmit a power to the shaft 10 shown in FIG. 10; a gear 304 which corresponds to the gear 116 of FIG. 2 and is arranged to transmit rotation to the zoom driving shaft 15 shown in FIG. 2; a gear 301 which is arranged to constantly engage the gear 302 and to engage the change-over gear 309 in the case of focusing; a gear 303 which is arranged to constantly engage the gear 304 and to engage the change-over gear 309 in zooming; a moving plate 310 which corresponds to the moving plate 119 of the first embodiment and the moving plate 210 of the second embodiment; a spring 315 which is arranged to constantly pull the moving plate 310 forward (in the direction of arrow R as shown in FIG. 17); a power varying operation button 316 which is disposed on the surface of the external tube 21 (see FIG. 1) and is arranged to be shiftable in the circumferential direction of the tube 21; a switch 317 which corresponds to the switch 217 of the second embodiment; a switch 318 which corresponds to the switch 218 of the second embodiment; switch pieces 319 and 320 which correspond to the switch pieces 219 and 220 of the second embodiment respectively.

Like the power varying operation button 216 of the second embodiment, the power varying operation button 316 has a leg part 316a which protrudes downward. The moving plate 310 has a bent part 310d which is formed on the front side of the plate 310 and is arranged to engage one end of the spring 315. On the rear side of the moving plate 310 is formed a bent part 310c which is arranged to have the change-over gear carrying shaft 308 secured thereto. The moving plate 310 is provided further with cam slots 310a and 310b for inserting the leg part 316a of the power varying operation button 316. These cam slots 310a and 310b are arranged in a V shape in the horizontal plane of the plate 310 with their axis of symmetry arranged in parallel to the optical axis.

The switches 317 and 318 are disposed on two opposite sides of the moving path of the power varying operation button 316. The switch piece 317a of the switch 317 is arranged to engage one side edge of the button 316 when the button 316 reaches one end of its moving path. The switch piece 318a of the switch 318 is arranged to engage the other side edge of the button 316 when the button 316 comes to the other end of its moving path.

Figure 20:
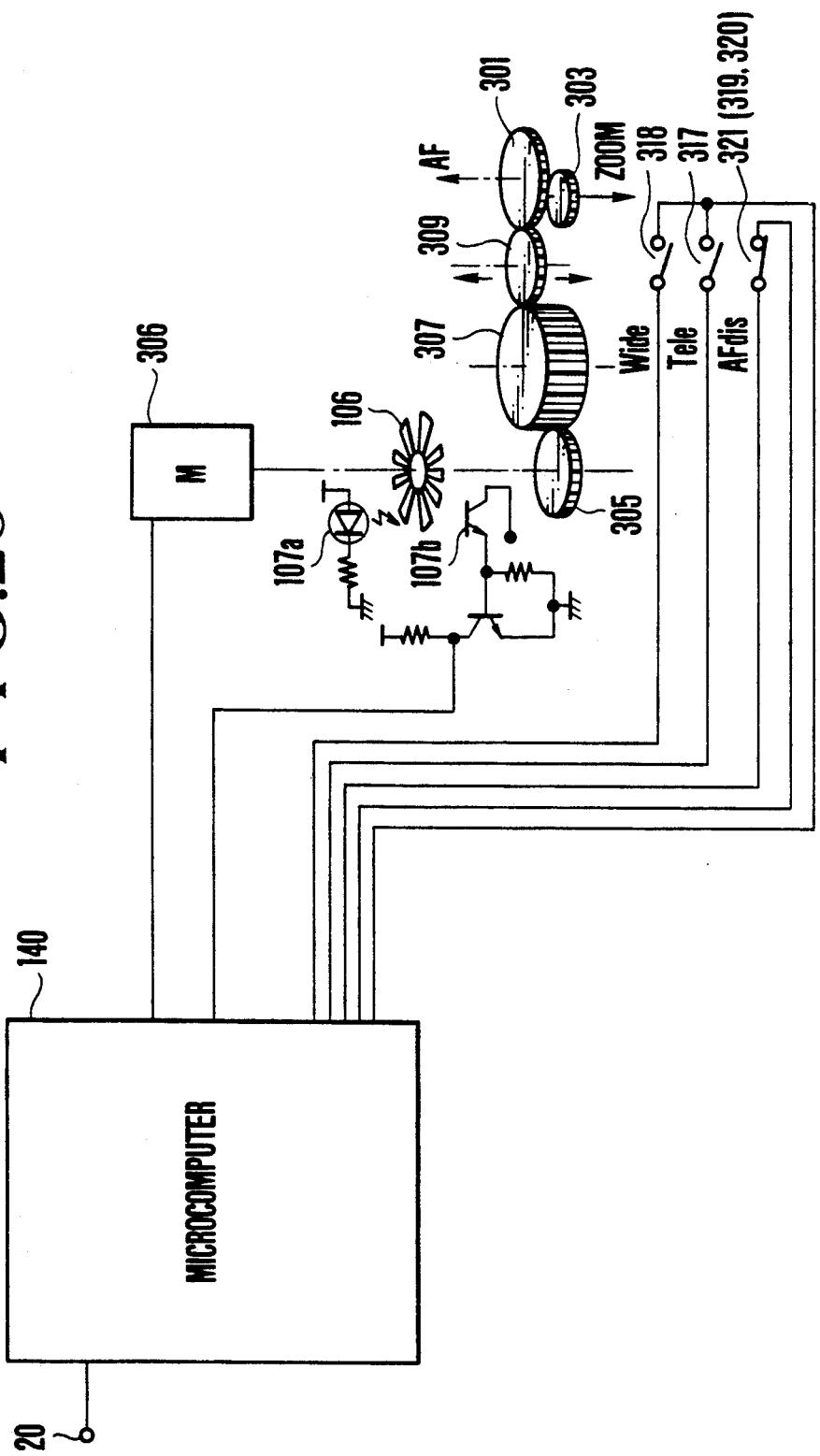
FIG. 20 shows a control system provided for the lens driving mechanism shown in FIG. 17.

FIG. 20 shows in outline the control system of the photo-taking optical system driving mechanism of the third embodiment. The control system corresponds to the control systems of the first and second embodiments shown in FIGS. 9 and 16. Referring to FIG. 20, a switch 321 is composed of switch pieces 319 and 320. The switch 321 is arranged to perform the same function as the switch 143 (FIG. 9) of the first embodiment and the switch 221 (FIG. 16) of the second embodiment.

In the case of a power varying operation, the zoom lens barrel of the third embodiment operates as described below with reference to FIGS. 17 to 20:

(ix) In cases where no power varying operation is performed and where a focusing action is performed When no power varying operation is performed, the power varying operation button 316 is in a neutral position contacting neither the switch piece 317a nor the switch piece 318a. The button 316, the moving plate 310 and the change-over gear 309 are then in their positions as shown in FIG. 17. Therefore, the driving force of the motor 306 is transmitted to the gear 302 of the focusing driving system. The zoom lens barrel is in a state of permitting a focusing action.

(x) In performing a zooming action for a longer focal length

When the power varying operation button 316 is manually shifted in the direction of arrow P along the circumferential surface of the external tube 21, the leg part 316a of the button 316 moves from the neutral position to the cam slot 310a. This causes the moving plate 310 to begin to move in the direction of arrow S along the optical axis against the force of the spring 315. The change-over gear carrying shaft 308 which is secured to the moving plate 310 also moves backward along with the latter. Further, the change-over gear 309 which is carried by the shaft 308 also begins to move backward from its position of FIG. 17. While the change-over gear 309 is still engaging the gear 301 immediately after commencement of its movement, the switch piece 319 is pushed by the bent part 310c of the moving plate 310 to come into contact with the switch piece 320. As a result, the switch 321 of FIG. 20 turns on. Upon detection of turning-on of the switch 321, the microcomputer 140 inhibits any driving action on the motor 306.

When the power varying operation button 316 is manually operated further in the direction of arrow P, the change-over gear 309 disengages from the gear 301. Then, there obtains a state in which the gear 309 engages neither the gear 301 nor the gear 303. After that, the gear 309 begins to engage the gear 303.

Figure 18:
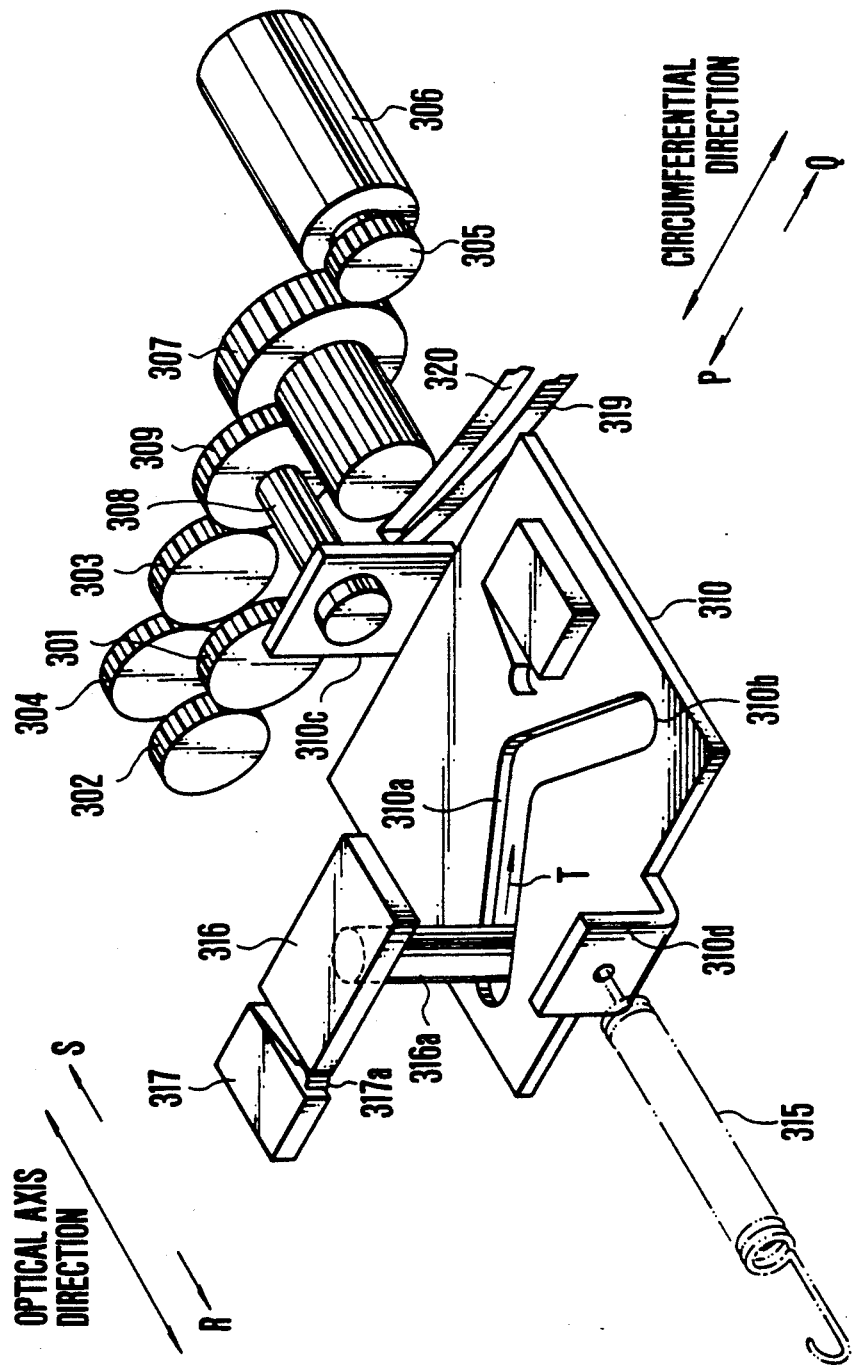
FIG. 18 shows the same mechanism of FIG. 17 in a state of allowing a zoom driving action in the telephoto direction.

When the change-over gear 309 comes to completely engage the gear 303, one side edge of the power varying operation button 316 engages the switch piece 317a to turn on the switch 317, as shown in FIG. 18. In response to turning-on of the switch 317, the microcomputer 140 allows the motor 306 to be driven. With the motor 306 thus caused to rotate, the rotation of the motor 306 is transmitted in sequence to the pinion 305, the gear 307, the change-over gear 309, the gear 303 and the gear 304. As a result, the shaft 15 (FIG. 2) which is arranged in one body with the gear 304 is rotated to drive the photo-taking optical system in the telephoto direction for zooming.

When the photographer ceases to push the power varying operation button 316 in the direction of arrow P, the force of the spring 315 causes the moving plate 310 to begin to move forward (in the direction of arrow R) from its position of FIG. 18. This causes the leg part 316a of the power varying operation button 316 to relatively move within the cam slot 310a of the moving plate 310 in the direction of arrow T (toward the neutral position). The button 316 thus begins to move in the direction of arrow Q. Therefore, the power varying operation button 316 parts from the switch piece 317a while the change-over gear 309 is still engaging the gear 303. The switch 317 of FIG. 20 then turns off from its on state. Upon detection of turning-off of the switch 317, the microcomputer 140 brings the driving action on the motor 306 to a stop. The zooming action in the telephoto direction then comes to an end.

After that, when the moving plate 310 is moved further forward by the force of the spring 315, the change-over gear 309 completely disengages from the gear 303. Then, further movement of the change-over gear 309 causes the gear 309 to come to engage the gear 301. When the gear 309 completely engages the gear 301, the switch piece 319 parts from the switch piece 320. The switch 321 of FIG. 20 then turns off. Upon detection of turning-off of the switch 321, the microcomputer 140 cancels the inhibition of the driving action on the motor 306. The motor 306 then becomes drivable for focusing.

(xi) In zooming for a shorter focal length

Referring to FIG. 17, when the power varying operation button 316 is manually moved in the direction of arrow Q along the circumferential surface of the lens barrel, the leg part 316a of the button 316 comes into the cam slot 310b from the neutral position shown in FIG. 17. The leg part 316a pushes the moving plate 310 to begin to move against the force of the spring 315 in the direction of arrow S along the optical axis. Therefore, the change-over gear 309 also begins to move rearward from its position of FIG. 17 along with the change-over gear carrying shaft 308. While the change-over gear 309 is still engaging the gear 301 immediately after commencement of its movement, the switch piece 319 is pushed by the bent part 310c of the moving plate 310 to come into contact with the other switch piece 320. As a result, the switch 321 of FIG. 20 turns on. Upon detection of turning-on of the switch 321, the microcomputer 140 inhibits any driving action on the motor 306.

Figure 19:
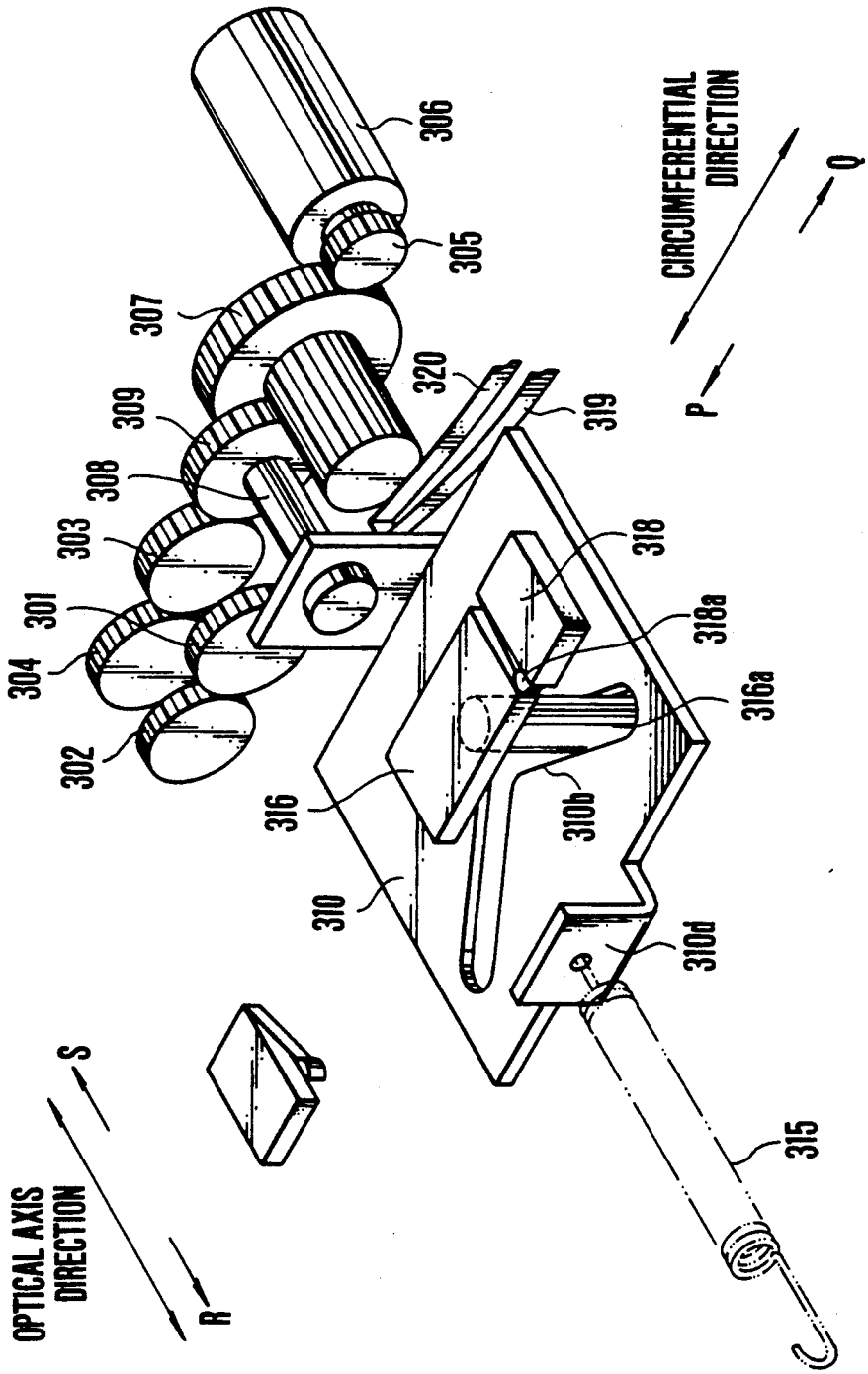
FIG. 19 shows the mechanism of FIG. 17 in a state of allowing a zoom driving action in the wide-angle direction.

When the power varying button 316 is manually moved further in the direction of arrow Q, the gear 309 disengages from the gear 301. Then, there obtains a state in which the gear 309 engages neither the gear 301 nor the gear 303. After that, the gear 309 begins to engage the gear 303. When the change-over gear 309 completely engages the gear 303, the side edge of the power varying operation button 316 comes to engage the switch piece 318a as shown in FIG. 19. The switch 318 turns on. In response to turning-on of the switch 318, the microcomputer 140 allows the motor 306 to be driven. With the motor 306 thus rotated, the rotation of the motor 306 is transmitted in sequence to the pinion 305, the gear 307, the change-over gear 309, the gear 303 and the gear 304 one after another. The shaft 15 which is arranged in one body with the gear 304 (FIG. 2) then rotates to shift the photo-taking optical system in the wide-angle direction for zooming.

When the power varying operation button 316 ceases to be manually driven in the direction of arrow Q, the force of moving the moving plate 310 rearward is no longer applied from the button 316. This allows the moving plate 310 to be caused by the force of the spring 315 to begin to move forward (in the direction of arrow R) from its position of FIG. 19. The change-over gear 309 also begins to move in the direction of arrow R from its position of FIG. 19. The leg part 316a of the button 316 relatively moves within the cam slot 316b toward its neutral position in the direction of arrow P. While the change-over gear 309 is still engaging the gear 303 in the initial stage of movement, the power varying operation button 316 parts from the switch piece 318a to turn off the switch 318 of FIG. 20 from its on-state. In response to this, the microcomputer 140 causes the driving action on the motor 306 to come to a stop. This brings the zooming action in the wide-angle direction to an end.

After this, when the moving plate 310 is moved further forward by the force of the spring 315, the change-over gear 309 completely disengages from the gear 303. Then, still further movement of the gear 309 causes the gear 309 to engage the gear 301. When the gears 309 and 301 come to completely engage each other, the witch piece 319 parts from the switch piece 320. The switch 321 of FIG. 20 then turns off. Upon detection of turning-off of the switch 321, the microcomputer 140 cancels the inhibition of the driving action on the motor 306. At this point of time, the motor 306 becomes drivable for focusing.

As described above, the lens barrel of the third embodiment comprises a change-over gear which is arranged to be set by urging means in a position to permit a focusing action when no power varying operation is performed; and change-over means for shifting the change-over gear against the urging means into a position to allow a zooming action only when a power varying operation member is operated. The so-called power zooming or the so-called power focusing is automatically selected in response to a simple operation on the power varying operation member. Besides, the arrangement of the embodiment obviates the necessity of use of any actuator such as a solenoid or the like for selection between zooming and focusing. Compared with the conventional known motor-operated zoom lens barrel, the embodiment of this invention is easier to operate and lower in manufacturing cost. It is another feature of the embodiment that the zoom lens barrel is arranged to come back to a focusable position immediately after the end of a power varying operation. The embodiment therefore excels in quick-shooting capability as well as in operability.

Further, in the case of this embodiment, the driving means for rotating and axially shifting the lens holding frame is composed of first and second shafts which are arranged to be relatively shiftable in the axial direction. This arrangement obviates the necessity of having a long axial length (tooth width) of the driven gear formed on the lens holding frame. Therefore, in accordance with this invention, the lens barrel can be prevented from increasing its size and the inertial mass of its lens holding frame. In addition to that, the rotating and shifting accuracy of the lens holding frame can be increased according to the invention.

The motor which is employed as a drive source is arranged within the lens barrel in the case of each of the embodiments described. However, this invention is not limited to this arrangement but is practicable by changing this to place the motor within the camera body and to transmit the output of the motor to the lens barrel through a transmission mechanism.

What is claimed is:

1. A lens barrel comprising:
   a) an operation member arranged to permit selection between a power varying operation in a telephoto direction and a power varying operation in a wide-angle direction;
   b) a first transmission mechanism for driving a focusing mechanism;
   c) a second transmission mechanism for driving a power varying mechanism;
   d) a driving mechanism arranged to generate a driving force; and
   e) a change-over mechanism arranged to connect said driving mechanism to said second transmission mechanism in response to said power varying operation of said operation member in the telephoto direction or in the wide-angle direction and to forcibly connect said driving mechanism to said first transmission mechanism in response to a cancellation of said power varying operation of said operation member.

2. A lens barrel according to claim 1, wherein said operation member includes a pair of buttons arranged to move perpendicularly to a plane which is parallel to an optical axis, and wherein said change-over mechanism is arranged to connect said driving mechanism to said second transmission mechanism in association with the movement of said buttons.

3. A lens barrel according to claim 2, wherein said operation member includes a member arranged to move in parallel to said optical axis, and wherein said change-over mechanism is arranged to connect said driving mechanism to said second transmission mechanism in association with the movement of said member.

4. A lens barrel according to claim 1, wherein said driving mechanism includes a motor.

5. A lens barrel according to claim 1, wherein said change-over mechanism includes spring means, and wherein said spring means is arranged to produce a force for connecting said driving mechanism to said first transmission mechanism in association with the cancellation of the power varying operation of said operation member.

6. A lens barrel according to claim 1, wherein said change-over mechanism includes spring means, and wherein said spring means is arranged to produce a force for connecting said driving mechanism to said first transmission mechanism when said operation member is not operated.

7. A lens barrel according to claim 1, wherein said operation member includes a member arranged to move around an optical axis, and wherein said change-over mechanism is arranged to connect said driving mechanism to said second transmission mechanism in association with the movement of said member.

8. A magnifying power varying device comprising:
   a) an operation member arranged to permit selection between a power varying operation in a telephoto direction and a power varying operation in a wide-angle direction;
   b) a transmission mechanism arranged to drive a magnifying power varying mechanism;
   c) a driving mechanism arranged to generate a driving force;
   d) a change-over mechanism arranged to connect said driving mechanism to said transmission mechanism in response to said power varying operation of said operation member n the telephoto direction or in the wide-angle direction and to forcibly disconnect said driving mechanism from said transmission mechanism in response to a cancellation of the power varying operation of said operation member.

9. A device according to claim 8, further comprising another transmission mechanism arranged to be connected to said driving mechanism in response to the cancellation of the power varying operation of said operation member.

10. A device according to claim 9, wherein said another transmission mechanism is arranged to drive a focusing mechanism.

11. A device according to claim 9, wherein said change-over mechanism includes spring means, and wherein said spring means is arranged to generate a force required for connecting said driving mechanism to said another transmission mechanism in response to the cancellation of the power varying operation of said operation member.

12. A device according to claim 8, wherein said change-over mechanism includes spring means, and wherein said spring means is arranged to generate in response to the cancellation of the power varying operation of said operation member, a force required for forcible disconnection of said driving mechanism from said transmission mechanism.

13. A lens barrel comprising:
   a) an operation member arranged to permit selection of two power varying directions including a telephoto direction and a wide-angle direction;
   b) a first gear train arranged to transmit a driving force for shifting a focusing lens;
   c) a second gear train arranged to transmit a driving force for shifting a variator lens;
   d) a single motor arranged to have a driving force to be transmitted to said first and second gear trains;
   e) a third gear train connected to said motor;
   f) a change-over gear arranged to selectively transmit the driving force of said motor which is transmitted to said third gear train either to said first gear train or to said second gear train irrespectively of the rotating direction of said motor;
   g) first urging means arranged to set said change-over gear in a first position where said change-over gear engages simultaneously with said first and third gear trains when said operation member is not operated; and h) change-over gear shifting means for shifting the position of said change-over gear against the force of said first urging means to a position where said change-over gear engages said second and third gear trains only when said operation member is operated.

14. A lens barrel comprising:
a) an operation member arranged to permit selection of two power varying directions including a telephoto direction and a wide-angle direction;
b) a first gear train arranged to transmit a driving force for shifting a focusing lens;
c) a second gear train arranged to transmit a driving force for shifting a variator lens;
d) a single motor arranged to have a driving force to be transmitted to said first and second gear trains;
e) a third gear train connected to said motor;
f) a change-over gear arranged to selectively transmit the driving force of said motor which is transmitted to said third gear train either to said first gear train or to said second gear train irrespectively of the rotating direction of said motor;
g) first urging means arranged to set said change-over gear in a first position where said change-over gear engages simultaneously with said first and third gear trains when said operation member is not operated;
h) change-over gear shifting means for shifting the position of said change-over gear against a force of said first urging means to a position where said change-over gear engages said second and third gear trains only when said operation member is operated; and
i) second urging means for forcibly urging said change-over gear to shift, immediately before said change-over gear begins to engage said second gear train, toward a position where said second gear train comes to engage said change-over gear.

15. A lens barrel comprising:
a) an operation member arranged to permit selection between a power varying operation in a telephoto direction and a power varying operation i a wide-angle direction;
b) a transmission mechanism arranged to drive a magnifying power varying mechanism;
c) a driving mechanism arranged to generate a driving force;
d) a change-over mechanism arranged to connect said driving mechanism to said transmission mechanism in response to said power varying operation of said operation member in said telephoto direction or said wide-angle direction; and
e) detection means for detecting said power varying operation performed by said operation member, said detection means being arranged to be capable of making a discrimination between the power varying operation in said telephoto direction and the power varying operation in said wide-angle direction.

16. A lens barrel according to claim 15, wherein said operation member includes a pair of buttons arranged to be movable perpendicularly to a plane which is parallel to an optical axis, and wherein said change-over mechanism is arranged to connect said driving mechanism to said transmission mechanism in association with the movement of said buttons.

17. A lens barrel according to claim 16, wherein said detection means includes a switch arranged to detect the movement of said buttons.

18. A lens barrel according to claim 15, wherein said operation member includes a member arranged to move in parallel to an optical axis, and wherein said change-over mechanism is arranged to connect said driving mechanism to said transmission mechanism in association with the movement of said member.

19. A lens barrel according to claim 18, wherein said detection means includes a switch arranged to detect the movement of said member.

20. A lens barrel according to claim 15, further comprising another transmission mechanism arranged to be connected to said driving mechanism in response to a cancellation of the power varying operation of said operation member.

21. A lens barrel according to claim 20, wherein said another transmission mechanism is arranged to drive a focusing mechanism.

22. A lens barrel according to claim 20, wherein said change-over mechanism includes spring means, and wherein said spring means is arranged to generate a force required for connecting said driving mechanism to said another transmission mechanism in response to the cancellation of the power varying operation of said operation member.

23. A lens barrel according to claim 15, further comprising a control circuit arranged to change over the driving direction of said driving mechanism according to an output of said detection means.

24. A lens barrel according to claim 23, wherein said transmission mechanism is arranged to change over the power varying direction thereof according to the change-over mechanism of the driving direction of said driving mechanism.

25. A magnifying power varying device comprising:
a) an operation member arranged to permit selection between a power varying operation in a telephoto direction and a power varying operation in a wide-angle direction;
b) a transmission mechanism arranged to drive a magnifying power varying mechanism;
c) a driving mechanism arranged to generate a driving force;
d) a change-over mechanism arranged to connect said driving mechanism to said transmission mechanism in response to said power varying operation of said operation member in said telephoto direction or said wide-angle direction; and
e) detection means for detecting said power varying operation performed by said operation member, said detection means being arranged to be capable of making a discrimination between the power varying operation in said telephoto direction and the power varying operation in said wide-angle direction.

26. A device according to claim 25, wherein said operation member includes a pair of buttons arranged to be movable perpendicularly to a plane which is parallel to an optical axis, and wherein said change-over mechanism is arranged to connect said driving mechanism to said transmission mechanism in association with the movement of said buttons.

27. A device according to claim 26, wherein said detection means includes a switch arranged to detect the movement of said buttons.

28. A device according to claim 25, wherein said operation member includes a member arranged to move in parallel to an optical axis, and wherein said change-over mechanism is arranged to connect said driving mechanism to said transmission mechanism in association with the movement of said member.

29. A device according to claim 28, wherein said detection means includes a switch arranged to detect the movement of said member.

30. A device according to claim 25, further comprising another transmission mechanism arranged to be connected to said driving mechanism in response to a cancellation of the power varying operation of said operation member.

31. A device according to claim 30, wherein said another transmission mechanism is arranged to drive a focusing mechanism.

32. A device according to claim 30, wherein said change-over mechanism includes spring means, and wherein said spring means is arranged to generate a force required for connecting said driving mechanism to said another transmission mechanism in response to the cancellation of the power varying operation of said operation member.

33. A device according to claim 25, further comprising a control circuit arranged to change over the driving direction of said driving mechanism according to an output of said detection means.

34. A device according to claim 33, wherein said transmission mechanism is arranged to change over the power varying direction thereof according to the change-over of the driving direction of said driving mechanism.

35. A lens barrel according to claim 33, wherein said driving mechanism includes a motor, and wherein said transmission mechanism is arranged to change over the magnifying power varying direction thereof in response to change-over of the rotating direction of said motor.

36. A device according to claim 34, wherein said driving mechanism includes a motor, and wherein said transmission mechanism is arranged to change over the magnifying power varying direction thereof in response to change-over of the rotating direction of said motor.

37. A lens barrel comprising:

a) an operation member arranged to permit selection of two power varying directions including a telephoto direction and a wide-angle direction;
b) a first gear train arranged to transmit a driving force for shifting a focusing lens;
c) a second gear train arranged to transmit a driving force for shifting a variator lens;
d) a single motor arranged to have a driving force to be transmitted to said first and second gear trains;
e) a third gear train connected to said motor;
f) a change-over gear arranged to selectively transmit the driving force of said motor which is transmitted to said third gear train either to said first gear train or to said second gear train irrespectively of the rotating direction of said motor;
g) urging means for constantly urging said change-over gear toward a position where said change-over gear engages said first and third gear trains;
h) change-over means for shifting, when said operation member is operated, said change-over gear to a position where said change-over gear engages said second gear train in mechanical association with a movement of said operation member;
i) a first switch which operates when said operation member is operated in the telephoto direction; and
j) a second switch which operates when said operation member is operated in the wide-angle direction.

38. A lens barrel comprising:

a) a lens holding frame arranged to hold a lens and having a gear part formed thereon around an axis of said lens;
b) a first shaft arranged to be rotated;
c) a second shaft arranged to engage said first shaft in such a way as to be rotatable integrally with said first shaft in a rotating direction and to be movable relative to said first shaft in the direction of said axis; and
d) a driving gear arranged to engage said gear part of said lens holding frame and secured to said first shaft, said driving gear being arranged such that said driving gear remains engaged with said gear part without moving relative to said gear part in the axial direction when said lens holding frame moves in parallel to the axis of said lens while said first and second shafts are axially moving relative to each other.

* * * * *

UNITED STATES PATENT AND TRADEMARK OFFICE
CERTIFICATE OF CORRECTION

PATENT NO. : 5,115,348
DATED : May 19, 1992
INVENTOR(S) : Hidefumi Notagashira

It is certified that error appears in the above-identified patent and that said Letters Patent is hereby corrected as shown below:

```
Col. 2,  line 8.   Change "arrangedwithin" to --
                   arranged within --
Col. 7,  line 13.  Change "101(" to -- 101ℓ --
Col. 8,  line 57.  Change "101i" to -- 101ℓ --

Col. 15, line 39.  Change "as" to -- As --
Col. 20, line 41.  Change "witch" to -- switch --

Col. 22, line 19.  Change "n" to -- in --
Col. 23, line 43.  Change "i" to -- in --
Col. 24, line 36.  Delete "mechanism"
```

Signed and Sealed this

Fifth Day of October, 1993

Attest:

BRUCE LEHMAN

*Attesting Officer*     *Commissioner of Patents and Trademarks*